(12) United States Patent
Asahi et al.

(10) Patent No.: US 12,282,199 B2
(45) Date of Patent: Apr. 22, 2025

(54) LIGHT EMITTING DEVICE, MANUFACTURING METHOD THEREFOR, AND WAVEGUIDE STRUCTURE

(71) Applicant: Panasonic Intellectual Property Management Co., Ltd., Osaka (JP)

(72) Inventors: Takehiro Asahi, Osaka (JP); Naoya Ryoki, Osaka (JP); Yukio Nishikawa, Osaka (JP); Yoshio Okayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 225 days.

(21) Appl. No.: 17/807,889

(22) Filed: Jun. 21, 2022

(65) Prior Publication Data

US 2023/0021122 A1    Jan. 19, 2023

(30) Foreign Application Priority Data

Jul. 9, 2021   (JP) ................. 2021-114488

(51) Int. Cl.
*F21V 8/00*       (2006.01)
*G02B 6/32*      (2006.01)
(Continued)

(52) U.S. Cl.
CPC ......... *G02B 6/4207* (2013.01); *G02B 6/0088* (2013.01); *G02B 6/009* (2013.01);
(Continued)

(58) Field of Classification Search
CPC ...... G02B 6/42; G02B 6/0091; G02B 6/0086; G02B 6/0088; G02B 6/009; G02F 1/377
See application file for complete search history.

(56) References Cited

U.S. PATENT DOCUMENTS 5,313,543 A     5/1994  Matsuda et al.
6,317,546 B1 *  11/2001  Kasazumi ................ G02B 6/42
                                                         359/332
(Continued)

FOREIGN PATENT DOCUMENTS

JP       58-132709           8/1983
JP       S6122311 A  *       1/1984
(Continued)

OTHER PUBLICATIONS

Post by Rich L., Mar. 12, 2012, and Post by Holzner, Oct. 1, 2019, Physics Stack Exchange, accessed via url: https://physics.stackexchange.com/questions/22279/efficiencies-of-coupling-light-into-a-fiber (Year: 2019).*

(Continued)

*Primary Examiner* — Michelle R Connelly
*Assistant Examiner* — Kirsten D. Endresen
(74) *Attorney, Agent, or Firm* — Wenderoth, Lind & Ponack, L.L.P.

(57) ABSTRACT

A light emitting device includes a light source and a waveguide structure. The light source emits light having a directionality. The waveguide structure includes an optical waveguide and an exterior part. The optical waveguide has an incident end surface and an emission end surface, converts a wavelength of the light incident from the incident end surface, and emits the light from the emission end surface. The exterior part is optically transparent and covers the optical waveguide such that the incident end surface and the emission end surface are exposed from the exterior part. The optical waveguide is elongated in a length direction. The length direction of the optical waveguide is inclined at a predetermined angle with respect to an optical axis of the light in a predetermined plane including the length direction of the optical waveguide and the optical axis of the light. The (Continued)

predetermined angle is set to allow the light to propagate in the optical waveguide with total internal reflection at a boundary surface between the optical waveguide and the exterior part.

22 Claims, 6 Drawing Sheets

(51) Int. Cl.
 G02B 6/42 (2006.01)
 G02F 1/377 (2006.01)
(52) U.S. Cl.
 CPC ........... *G02B 6/0091* (2013.01); *G02F 1/377* (2013.01); *G02B 6/327* (2013.01); *G02B 6/4203* (2013.01); *G02B 6/4206* (2013.01)

(56) References Cited

U.S. PATENT DOCUMENTS

| | | | |
|---|---|---|---|
| 2003/0031443 A1* | 2/2003 | Soljacic | C03C 3/07 65/435 |
| 2007/0091312 A1* | 4/2007 | Naito | H01L 31/0203 356/400 |
| 2009/0087142 A1 | 4/2009 | Shibayama | |

FOREIGN PATENT DOCUMENTS

| | | |
|---|---|---|
| JP | 4-361210 | 12/1992 |
| JP | 5-323404 | 12/1993 |
| JP | 6-160930 | 6/1994 |
| JP | 8-160257 | 6/1996 |
| JP | 11-295559 | 10/1999 |
| JP | 2000-171653 | 6/2000 |
| JP | 2004-85731 | 3/2004 |
| JP | 2007-114677 | 5/2007 |
| JP | 2009-98601 | 5/2009 |
| JP | 2009-260118 | 11/2009 |
| JP | 2015-99307 | 5/2015 |

OTHER PUBLICATIONS

Thorlabs, 6-Axis Kinematic Module, Archived Apr. 9, 2016 by the Wayback Machine, accessed via url: https://web.archive.org/web/20160409072559/http://www.thorlabs.com/newgrouppage9.cfm?objectgroup_id=211 (Year: 2016).*

Cabatic et al. "Optical Mounting: Choosing the right optical mount", Laser Focus World, 2001, accessed via url: https://www.laserfocusworld.com/software-accessories/positioning-support-accessories/article/16555792/optical-mounting-choosing-the-right-optical-mount (Year: 2001).*

* cited by examiner

LIGHT EMITTING DEVICE, MANUFACTURING METHOD THEREFOR, AND WAVEGUIDE STRUCTURE

BACKGROUND

1. Technical Field

The present disclosure generally relates to a light emitting device, a manufacturing method for a light emitting device, and a waveguide structure. More specifically, the present disclosure relates to a light emitting device including a light source that emits light having directionality and a waveguide structure, a manufacturing method for the light emitting device, and a waveguide structure used in the light emitting device.

2. Description of the Related Art

PTL 1 discloses an optical waveguide second-harmonic generation (SHG) element as a light emitting device. In PTL 1, at least one of an incident end surface and an emission end surface of the optical waveguide SHG element is inclined with respect to a plane perpendicular to an optical axis of laser light emitted from a semiconductor laser. This structure prevents reflected light from the incident end surface or the emission end surface from returning to a laser light source and damaging the laser light source.

CITATION LIST

Patent Literature

PTL 1: Unexamined Japanese Patent Publication No. H 6-160930

SUMMARY

A light emitting device according to one aspect of the present disclosure includes: a light source configured to emit light having a directionality; and a waveguide structure including an optical waveguide that has an incident end surface and an emission end surface, and an exterior part that is optically transparent and covers the optical waveguide with the incident end surface and the emission end surface being exposed from the exterior part. The optical waveguide is configured to convert a wavelength of the light incident from the incident end surface and emit the light from the emission end surface. The optical waveguide is elongated in a length direction. The length direction of the optical waveguide is inclined at a predetermined angle with respect to an optical axis of the light in a predetermined plane including the length direction of the optical waveguide and the optical axis of the light. The predetermined angle is set to allow the light to propagate in the optical waveguide with total internal reflection at a boundary surface between the optical waveguide and the exterior part.

A manufacturing method according to one aspect of the present disclosure is a manufacturing method for a light emitting device that includes: a light source that emits light having a directionality; and a waveguide structure including an optical waveguide that has an incident end surface and an emission end surface, and an exterior part that is optically transparent and covers the optical waveguide such that the incident end surface and the emission end surface are exposed from the exterior part. The optical waveguide converts a wavelength of the light incident from the incident end surface, and emits the light from the emission end surface. The manufacturing method includes setting a predetermined angle to allow the light to propagate in the optical waveguide with total internal reflection at a boundary surface between the optical waveguide and the exterior part. The optical waveguide is elongated in a length direction. The predetermined angle is an angle between the length direction of the optical waveguide and an optical axis of the light in a predetermined plane including the length direction of the optical waveguide and the optical axis of the light.

A waveguide structure according to one aspect of the present disclosure includes: an optical waveguide that has an incident end surface and an emission end surface and is configured to convert a wavelength of light, which has a directionality and is incident from the incident end surface and emit the light from the emission end surface; and an exterior part that is optically transparent and covers the optical waveguide with the incident end surface and the emission end surface being exposed from the exterior part. The optical waveguide is elongated in a length direction. The length direction of the optical waveguide is inclined at a predetermined angle with respect to an optical axis of the light in a predetermined plane including the length direction of the optical waveguide and the optical axis of the light. The predetermined angle is set to allow the light to propagate in the optical waveguide with total internal reflection at a boundary surface between the optical waveguide and the exterior part.

DETAILED DESCRIPTIONS

In a light emitting device of PTL 1, there is no consideration on a structure in which laser light is efficiently incident into an optical waveguide, and the laser light propagates with high efficiency without leaking to an exterior part during the propagation in the optical waveguide.

Furthermore, the wavelength conversion efficiency of the laser light propagating in the optical waveguide is not taken into consideration, either so that there is a possibility that the wavelength conversion efficiency is lowered.

The present disclosure provides a light emitting device, a manufacturing method therefor, and a waveguide structure that can reduce damage to a light source and improve the utilization efficiency and the wavelength conversion efficiency of light.

Hereinafter, exemplary embodiments will be described in detail with reference to the drawings as appropriate. However, unnecessarily detailed description may be omitted. For example, detailed description on already known matters and duplicated description on substantially identical configurations may be omitted. These omissions are intended to avoid excessive redundancy in the following description, and to facilitate understanding of those skilled in the art. The inventor(s) of the present disclosure provide the accompanying drawings and the following description to help those skilled in the art to fully understand the present disclosure and thus do not intend to limit the subject matter defined in the appended claims thereby.

[1. Exemplary Embodiments]

1.1 First Exemplary Embodiment

[1.1.1 Overview]

Figure 1:
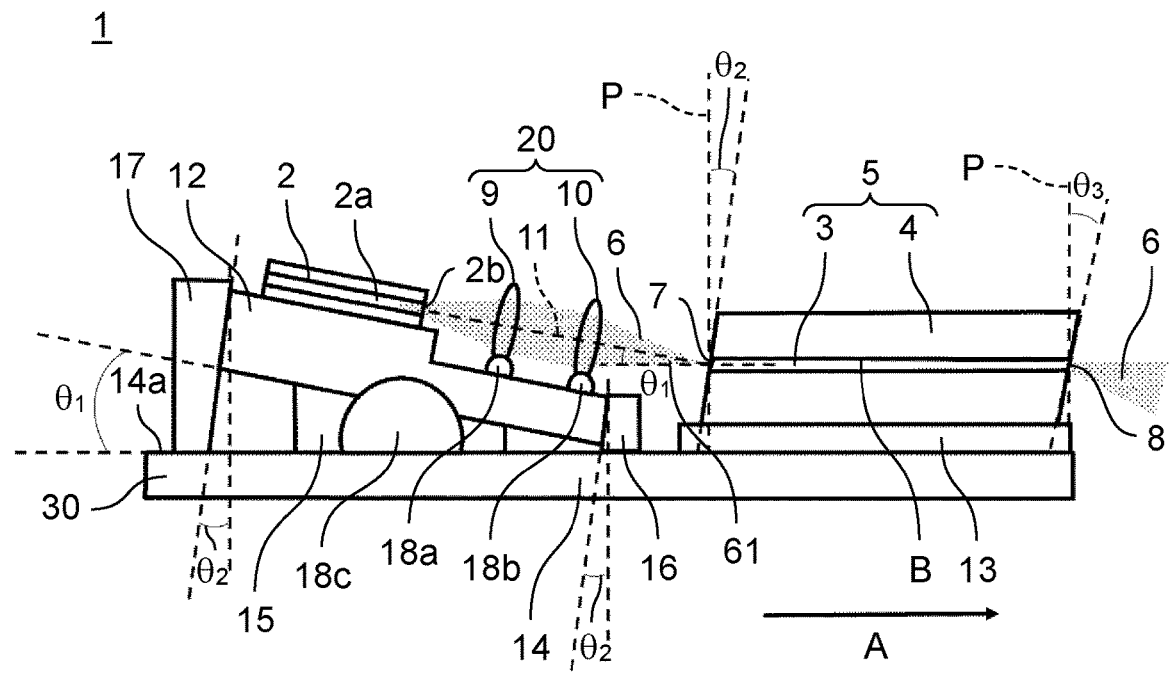
FIG. 1 is a schematic side view of a configuration example of a light emitting device of a first exemplary embodiment.

FIG. 1 is a schematic side view of a configuration example of light emitting device 1 of a first exemplary embodiment. Light emitting device 1 of FIG. 1 includes light source 2 and waveguide structure 5. Light source 2 emits light 6 having directionality. Waveguide structure 5 includes optical waveguide 3 and exterior part 4. Optical waveguide 3 has incident end surface 7 and emission end surface 8, converts a wavelength of light 6 incident from incident end surface 7, and emits light 6 from emission end surface 8. Exterior part 4 is optically transparent and covers optical waveguide 3 such that incident end surface 7 and emission end surface 8 are exposed. Optical waveguide 3 extends in length direction A. Length direction A of optical waveguide 3 is inclined at a predetermined angle with respect to optical axis 11 of light 6 in a predetermined plane including length direction A of optical waveguide 3 and optical axis 11 of light 6. The predetermined angle is set such that light 6 propagates in optical waveguide 3 while being totally and internally reflected at boundary surface B between optical waveguide 3 and exterior part 4.

In light emitting device 1 of FIG. 1, length direction A of optical waveguide 3 is inclined at the predetermined angle with respect to optical axis 11 of light 6 in the predetermined plane including length direction A of optical waveguide 3 and optical axis 11 of light 6. Therefore, a traveling direction of light 6 is inclined with respect to the length direction of optical waveguide 3. As a result, a length of an optical path along which light 6 propagates in optical waveguide 3 while being reflected by boundary surface B between optical waveguide 3 and exterior part 4 is longer than a length of optical waveguide 3, and thus, the wavelength conversion efficiency increases. In light emitting device 1 of FIG. 1, the predetermined angle is set such that light 6 propagates in optical waveguide 3 while being totally and internally reflected at boundary surface B between optical waveguide 3 and exterior part 4. As a result, light 6 can propagate more efficiently without leaking from optical waveguide 3 to exterior part 4. Therefore, according to light emitting device 1 of the present exemplary embodiment, damage to the light source can be reduced, and further, the utilization efficiency and the wavelength conversion efficiency of light can be improved.

[1.1.2 Details]

Hereinafter, light emitting device 1 of the present exemplary embodiment will be described in detail. As illustrated in FIG. 1, light emitting device 1 includes light source 2 and waveguide structure 5.

Light source 2 emits light 6 having directionality. In FIG. 1, light 6 travels along optical axis 11. Light source 2 is a laser, for example, a semiconductor laser. Light 6 is laser light. Light source 2 includes, for example, active layer 2a. One end surface of active layer 2a of light source 2 is emission surface 2b from which light 6 is emitted. Note that the semiconductor laser has a lower output than a processing laser or the like, but has a small size, and thus, can be combined with a small optical system to form a small light emitting device. The wavelength of light 6 is not limited to a wavelength in a visible light region, and may be a wavelength in an infrared region and a wavelength in an ultraviolet region.

Figure 2:
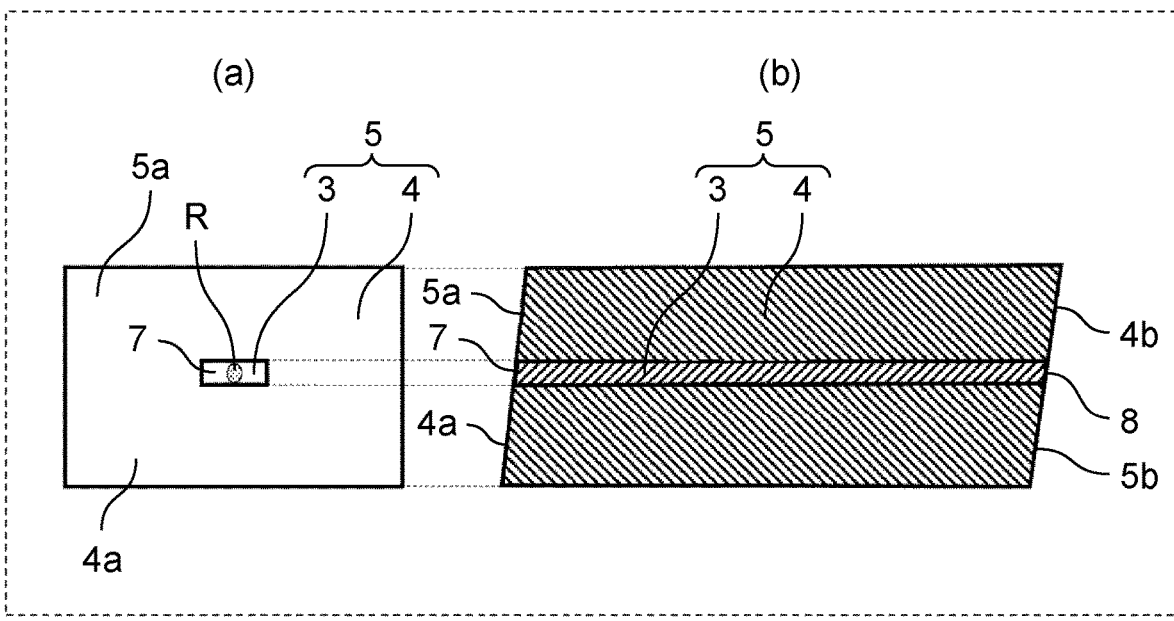
FIG. 2 is an external view of a configuration example of a waveguide structure of the light emitting device of FIG. 1.

FIG. 2 illustrates a configuration example of waveguide structure 5. In FIG. 2, part (a) is a front view of waveguide structure 5, and part (b) is a cross-sectional view of waveguide structure 5. Waveguide structure 5 includes optical waveguide 3 and exterior part 4.

Optical waveguide 3 is a transmission path of light 6 emitted from light source 2. Optical waveguide 3 has incident end surface 7 and emission end surface 8. Optical waveguide 3 converts the wavelength of light 6 incident from incident end surface 7 and emits light 6 from emission end surface 8.

As illustrated in FIG. 1, optical waveguide 3 extends in length direction A in waveguide structure 5. Length direction A of optical waveguide 3 is inclined at the predetermined angle (a first predetermined angle) (indicated by $\theta_1$ in FIG. 1) with respect to optical axis 11 of light 6 in the predetermined plane including length direction A of optical waveguide 3 and optical axis 11 of light 6. First predetermined angle $\theta_1$ is positive in the clockwise direction in FIG. 1 with respect to length direction A of optical waveguide 3. In addition, incident end surface 7 of waveguide structure 5 is inclined at a second predetermined angle (indicated by $\theta_2$ in FIG. 1) with respect to vertical plane P perpendicular to length direction A of optical waveguide 3 in the predetermined plane. Second predetermined angle $\theta_2$ is positive in the clockwise direction in FIG. 1 with respect to vertical plane P. Further, emission end surface 8 of waveguide structure 5 is inclined at a third predetermined angle (indicated by $\theta_3$ in FIG. 1) with respect to vertical plane P in the predetermined plane. Third predetermined angle $\theta_3$ is positive in the clockwise direction in FIG. 1 with respect to vertical plane P. First predetermined angle $\theta_1$ to third predetermined angle $\theta_3$ will be described later.

In the present exemplary embodiment, optical waveguide 3 has a hexahedral shape. More specifically, in optical waveguide 3 of the present exemplary embodiment, incident end surface 7 and emission end surface 8, which are both surfaces in length direction A, are rectangular, both surfaces in a thickness direction (an upper surface and a lower surface in part (b) of FIG. 2) are rectangular, and both surfaces in a width direction (a left surface and a right surface in part (a) of FIG. 2) are trapezoidal. The shape of optical waveguide 3 is not limited thereto, and may be any shape that enables the transmission of light 6. Optical waveguide 3 is made of a material having a light transmitting property, for example, oxide materials such as quartz glass and sapphire, inorganic materials such as a semiconductor including silicon, gallium nitride, and aluminum nitride, or polymer materials such as a polyimide-based resin and a polyamide-based resin.

Exterior part 4 covers optical waveguide 3. Exterior part 4 of FIG. 2 covers optical waveguide 3 such that incident end surface 7 and emission end surface 8 of optical waveguide 3 are exposed. Exterior part 4 has a rectangular parallelepiped shape. Exterior part 4 covers optical waveguide 3 such that a length direction of exterior part 4 coincides with length direction A of optical waveguide 3. Incident end surface 7 and emission end surface 8 of optical waveguide 3 are respectively exposed to first and second surfaces 4a and 4b in the length direction of exterior part 4. In the present exemplary embodiment, exterior part 4 is optically transparent. Exterior part 4 is made of a material having a light transmitting property, for example, oxide materials such as quartz glass and sapphire, inorganic materials such as a semiconductor including silicon, gallium nitride, and aluminum nitride, or polymer materials such as a polyimide-based resin and a polyamide-based resin. In the present exemplary embodiment, exterior part 4 is made of a material having a smaller refractive index than optical waveguide 3.

Waveguide structure 5 is, for example, an optical waveguide SHG element. Waveguide structure 5 of FIG. 2 has end surface 5a on a side of light source 2 and end surface 5b on a side opposite to light source 2. End surface 5a includes incident end surface 7 of optical waveguide 3 and first surface 4a of exterior part 4. End surface 5b includes emission end surface 8 of optical waveguide 3 and second surface 4b of exterior part 4. Light 6 incident on optical waveguide 3 from incident end surface 7 of optical waveguide 3 of waveguide structure 5 propagates in length direction A of optical waveguide 3 while being reflected at boundary surface B between optical waveguide 3 and exterior part 4, and is subjected to wavelength conversion in the process of propagation. Light 6 whose wavelength has been converted is emitted from emission end surface 8 to the outside of waveguide structure 5.

In the present exemplary embodiment, light 6 has directionality, and is, for example, laser light. The laser light is generally considered to have good straightness, but actually travels while diverging at a certain angle in many cases. In a case where light 6 emitted from light source 2 diverges to the outside of optical waveguide 3, a part of light 6 does not enter optical waveguide 3 and becomes a loss, and the optical coupling efficiency decreases. Therefore, light emitting device 1 further includes converging optical system 20 in order to converge light 6.

Converging optical system 20 is disposed between light source 2 and waveguide structure 5. Converging optical system 20 is disposed on optical axis 11 of light 6 and converges light 6 on incident end surface 7. Converging optical system 20 of FIG. 1 includes first convex lens 9 and second convex lens 10. Converging optical system 20 is configured such that a component (second convex lens 10) located closest to incident end surface 7 side is a converging lens. First convex lens 9 and second convex lens 10 are disposed on optical axis 11 of light 6, and light 6 from light source 2 passes through first convex lens 9 and second convex lens 10 in this order and is incident on waveguide structure 5. Light 6 becomes parallel light by first convex lens 9 and is converged by second convex lens 10. In this manner, converging optical system 20 converges light 6 using first convex lens 9 and second convex lens 10 disposed between light source 2 and waveguide structure 5. In the present exemplary embodiment, light 6 is laser light. In general, an intensity distribution of the laser light is a Gaussian distribution. Light 6 has beams 61 defined in a range from a peak intensity of light 6 to an intensity of $1/e^2$ of the peak intensity of light 6, inclusive. In part (a) of FIG. 2, region R corresponds to a cross section of beams 61 on end surface 5a of waveguide structure 5. As illustrated in part (a) of FIG. 2, region R falls within incident end surface 7 by converging optical system 20. That is, region R is within incident end surface 7 on end surface 5a and is not located on first surface 4a. In other words, it can be said that the cross section of light 6 on incident end surface 7 is included in incident end surface 7. Since region R falls within incident end surface 7 in the present exemplary embodiment, it is possible to reduce the loss when light 6 enters optical waveguide 3. In particular, in part (a) of FIG. 2, a shape of region R is elliptical, and a shape of incident end surface 7 of optical waveguide 3 is rectangular. Here, a diameter of region R is smaller than a length of a short side of incident end surface 7, whereby region R is included in incident end surface 7. Therefore, it is possible to make light 6 efficiently enter optical waveguide 3.

As described above, length direction A of optical waveguide 3 in light emitting device 1 of FIG. 1 is inclined at the first predetermined angle (indicated by $\theta_1$ in FIG. 1) with respect to optical axis 11 of light 6 in the predetermined plane including length direction A of optical waveguide 3 and optical axis 11 of light 6. As a result, a length of an optical path along which light 6 propagates in optical waveguide 3 while being reflected by boundary surface B between optical waveguide 3 and exterior part 4 is longer than a length of optical waveguide 3, and thus, the wavelength conversion efficiency increases. In addition, incident end surface 7 of waveguide structure 5 in FIG. 1 is inclined at the second predetermined angle (indicated by $\theta_2$ in FIG. 1) with respect to vertical plane P perpendicular to length direction A of optical waveguide 3 in the predetermined plane. As a result, it is possible to reduce a possibility that a part of light 6, reflected by incident end surface 7 toward optical waveguide 3, returns to light source 2 via converging optical system 20. This can reduce a possibility that light source 2 is damaged by return light of light 6.

Hereinafter, a relationship between first predetermined angle $\theta_1$ and second predetermined angle $\theta_2$ will be further described.

In light emitting device 1 of FIG. 1, first predetermined angle $\theta_1$ and second predetermined angle $\theta_2$ are set such that light 6 propagates in optical waveguide 3 while being totally and internally reflected at boundary surface B between optical waveguide 3 and exterior part 4. As a result, light 6 can propagate more efficiently without leaking from optical waveguide 3 to exterior part 4. Next, the relationship between first predetermined angle $\theta_1$ and second predetermined angle $\theta_2$ will be described with reference to FIG. 3.

Figure 3:
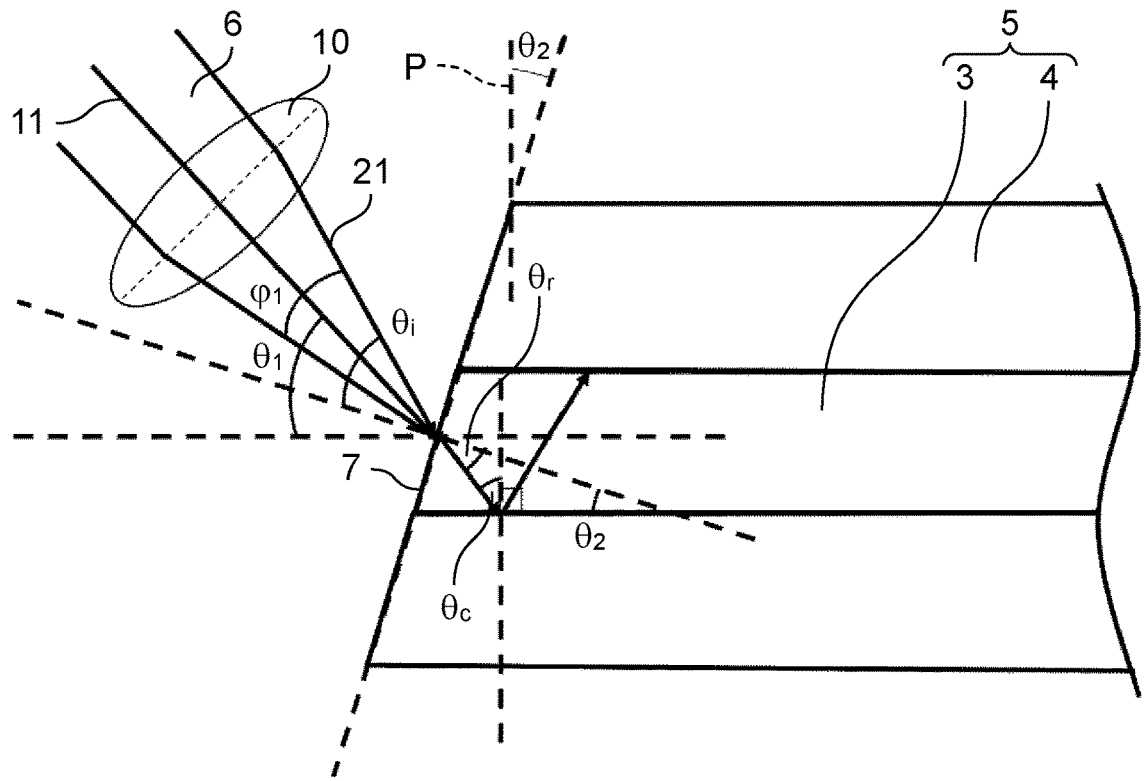
FIG. 3 is a schematic cross-sectional view illustrating an incident end surface of the waveguide structure of the light emitting device in FIG. 1.

FIG. 3 is a schematic cross-sectional view illustrating incident end surface 7 of waveguide structure 5 of light emitting device 1. Note that hatching that indicates a cross section is omitted in FIG. 3 merely for facilitating the viewability of the drawing.

In FIG. 3, it is desirable that light 6 entering optical waveguide 3 from incident end surface 7 be totally and internally reflected at boundary surface B between optical waveguide 3 and exterior part 4 and travel in length direction A of optical waveguide 3 in order to efficiently propagate without leaking out of optical waveguide 3. In the present exemplary embodiment, light 6 is incident on incident end surface 7 while being converged by second convex lens 10, and thus, outer edge 21 of light 6 in FIG. 3 has a minimum incident angle with respect to exterior part 4. First predetermined angle $\theta_1$ and second predetermined angle $\theta_2$ are set to satisfy a condition that not a central ray passing through the optical axis of light 6 but outer edge 21 of beams 61 of light 6 is totally and internally reflected at boundary surface B between optical waveguide 3 and exterior part 4. In FIG. 3, an incident angle of outer edge 21 of light 6 with respect to incident end surface 7 in the predetermined plane is denoted by $\theta i$, and an apex angle of a light flux of light 6 converged on incident end surface 7 by converging optical system 20 in the predetermined plane is denoted by $\varphi_1$. The apex angle $\varphi_1$ is an angle between outermost light fluxes among light fluxes of light 6 incident on incident end surface 7. In this case, $\theta_i$ is represented by $\theta_i = \theta_1 + \varphi_1/2 - \theta_2$. When the refractive index of exterior part 4 is denoted by $n_1$, the refractive index of optical waveguide 3 is denoted by $n_2$, and the refraction angle is denoted by $\theta r$, $\sin(\theta_i)/\sin(\theta_r) = n_2/n_1$ holds according to Snell's law. Then, $\theta_r = \arcsin\{\sin(\theta_1 + \varphi_1/2 - \theta_2)/n_2\}$ since $\sin(\theta_r) = \sin(\theta_1 + \varphi_1/2 - \theta_2)/n_2$. When an incident angle at which outer edge 21 of light 6 is incident on exterior part 4 from optical waveguide 3 is $\theta_c$, $\theta_c = 90° - \arcsin\{\sin(\theta_1 + \varphi_1/2 - \theta_2)/n_2\} - \theta_2$, since $\theta_c = 180° - 90° - \theta_r - \theta_2$. The condition that outer edge 21 of light 6 is totally and internally reflected at boundary surface B between optical waveguide 3 and exterior part 4 is $\theta_c \geq \arcsin(n_1/n_2)$. When the formula of $90° - \arcsin\{\sin(\theta_1 + \varphi_1/2 - \theta_2)/n_2\} - \theta_2 \geq \arcsin(n_1/n_2)$ is solved for $\theta_1$, the following Formula (1) is obtained.

$$\theta_1 \leq \arcsin\left[n_2 \cdot \sin\left\{90° - \theta_2 - \arcsin\left(\frac{n_1}{n_2}\right)\right\}\right] - \frac{\varphi_1}{2} + \theta_2 \qquad \text{Formula (1)}$$

From the above, $\theta_1$ satisfies the above Formula (1) when the refractive index of exterior part 4 is denoted by $n_1$, the refractive index of optical waveguide 3 is denoted by $n_2$, the first predetermined angle is denoted by $\theta 1$, the second predetermined angle is denoted by $\theta 2$, and the apex angle of the light flux of light 6 converged on incident end surface 7 by converging optical system 20 in the predetermined plane is denoted by $\varphi_1$ in light emitting device 1 of the present exemplary embodiment.

Incident end surface 7 of light emitting device 1 of FIG. 1 partially reflects beams 61 of light 6 to generate reflected beams. First predetermined angle $\theta_1$ and second predetermined angle $\theta_2$ are set such that the reflected beams are not incident on light source 2. This can prevent light source 2 from being damaged by return light of light 6. Next, the relationship between first predetermined angle $\theta_1$ and second predetermined angle $\theta_2$ will be described with reference to FIG. 4.

Figure 4:
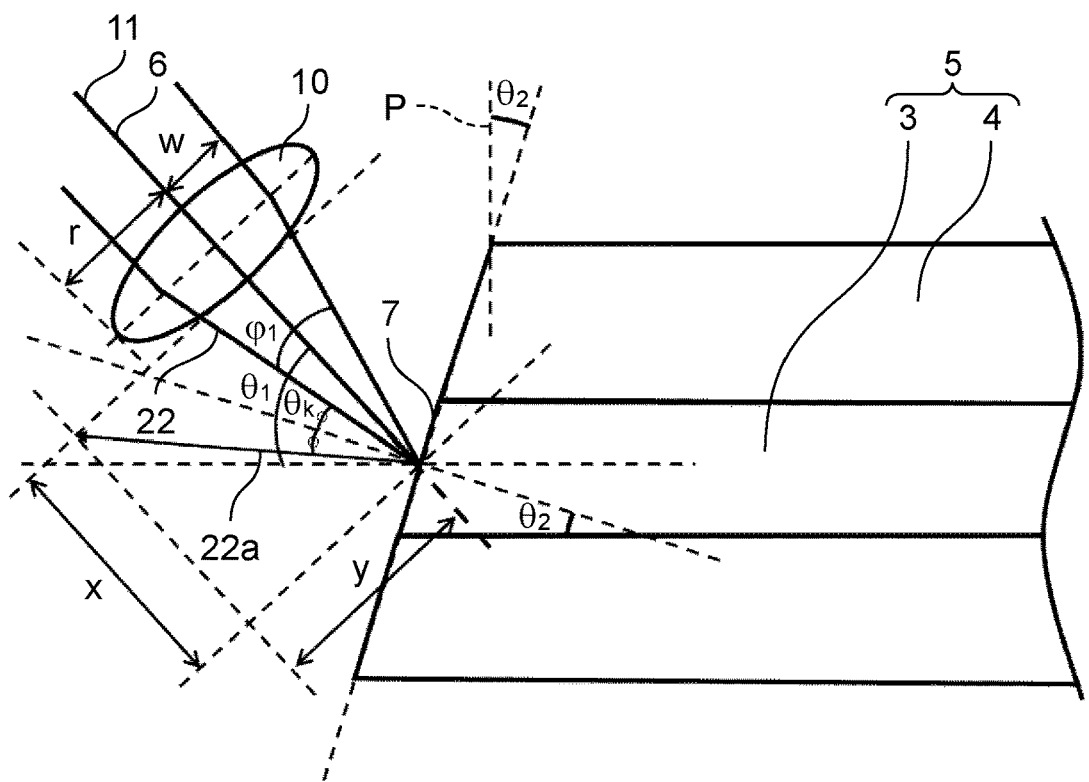
FIG. 4 is a schematic cross-sectional view illustrating the incident end surface of the waveguide structure of the light emitting device in FIG. 1.

FIG. 4 is a schematic cross-sectional view illustrating incident end surface 7 of optical waveguide 3 of waveguide structure 5 of light emitting device 1. Note that hatching that indicates a cross section is omitted in FIG. 4 merely for facilitating the viewability of the drawing.

In FIG. 4, when reflected light from incident end surface 7 returns to second convex lens 10, there is a possibility that the reflected light further returns to light source 2 via second convex lens 10 and first convex lens 9 so that light source 2 is damaged by energy of the reflected light. In order to prevent this possibility, it is conceivable to suppress the reflected light from incident end surface 7 from returning to second convex lens 10. Since light 6 is incident on incident end surface 7 while being converged by second convex lens 10 in the present exemplary embodiment, outer edge 22 of beams 61 of light 6 in FIG. 4 has a minimum incident angle on incident end surface 7. First predetermined angle $\theta_1$ and second predetermined angle $\theta_2$ are set so as to satisfy a condition that outer edge 22 of light 6 does not return to second convex lens 10 after being reflected by incident end surface 7. In FIG. 4, an incident angle of outer edge 22 of light 6 with respect to incident end surface 7 in the predetermined plane is denoted by $\theta_k$, and the apex angle of the light flux of light 6 converged on incident end surface 7 by converging optical system 20 in the predetermined plane is denoted by $\varphi_1$. In this case, $\theta_k = \theta_1 - \varphi_1/2 - \theta_2$ holds. A reflection angle of reflected light $22a$ on incident end surface 7 of outer edge 22 of light 6 is also $\theta_k$. A distance from incident end surface 7 to converging optical system 20 is denoted by x. In the case of FIG. 4, converging optical system 20 is configured such that a component located closest to incident end surface 7 side is a converging lens (second convex lens 10). Thus, x is a distance from incident end surface 7 to the converging lens (second convex lens 10). More specifically, x is a distance from incident end surface 7 to a surface of the converging lens (second convex lens 10). A distance between optical axis 11 and reflected light $22a$ in a direction orthogonal to optical axis 11 of light 6 in the predetermined plane is denoted by y. In this case, y is expressed by $y = x \cdot \tan(2\theta_k + \varphi_1/2)$. Since $\theta_k = \theta_1 - \varphi_1/2 - \theta_2$, $y = x \cdot \tan(2\theta_1 - 2\theta_2 - \varphi_1/2)$. An effective radius of converging optical system 20 is denoted by r. In the case of FIG. 4, converging optical system 20 is configured such that a component located closest to incident end surface 7 side is a converging lens (second convex lens 10). Thus, r is a radius of the converging lens (second convex lens 10). If $r < y$, reflected light $22a$ of outer edge 22 of light 6 is not incident on second convex lens 10. Since $y = x \cdot \tan(2\theta_1 - 2\theta_2 - \varphi_1/2)$, $r < x \cdot \tan(2\theta_1 - 2\theta_2 - \varphi_1/2)$ holds, and is solved for $\theta_1$ to obtain the following Formula (2).

$$\theta_1 > \frac{2\theta_2 + \dfrac{\varphi_1}{2} + \arctan\left(\dfrac{r}{x}\right)}{2} \qquad \text{Formula (2)}$$

From the above, $\theta_1$ satisfies the above Formula (2) when the effective radius of converging optical system 20 is denoted by r, the distance from incident end surface 7 to converging optical system 20 is denoted by x, the first predetermined angle is denoted by $\theta_1$, the second predetermined angle is denoted by $\theta 2$, and the apex angle of the light flux of light 6 converged on incident end surface 7 by converging optical system 20 in the predetermined plane is denoted by $\varphi_1$.

As described above, emission end surface 8 of in waveguide structure 5 in light emitting device 1 of FIG. 1 is inclined at third predetermined angle $\theta_3$ with respect to vertical plane P in the predetermined plane. First predetermined angle $\theta_1$, second predetermined angle $\theta_2$, and third predetermined angle $\theta_3$ are set such that light 6 that tries to exit through emission end surface 8 from the inside of optical waveguide 3 is not totally and internally reflected by emission end surface 8. As a result, a possibility that light 6 is confined in optical waveguide 3 is reduced, and the utilization efficiency of light 6 can be improved. Next, a relationship among first predetermined angle $\theta_1$, second predetermined angle $\theta_2$, and third predetermined angle $\theta_3$ will be described with reference to FIG. 5.

Figure 5:
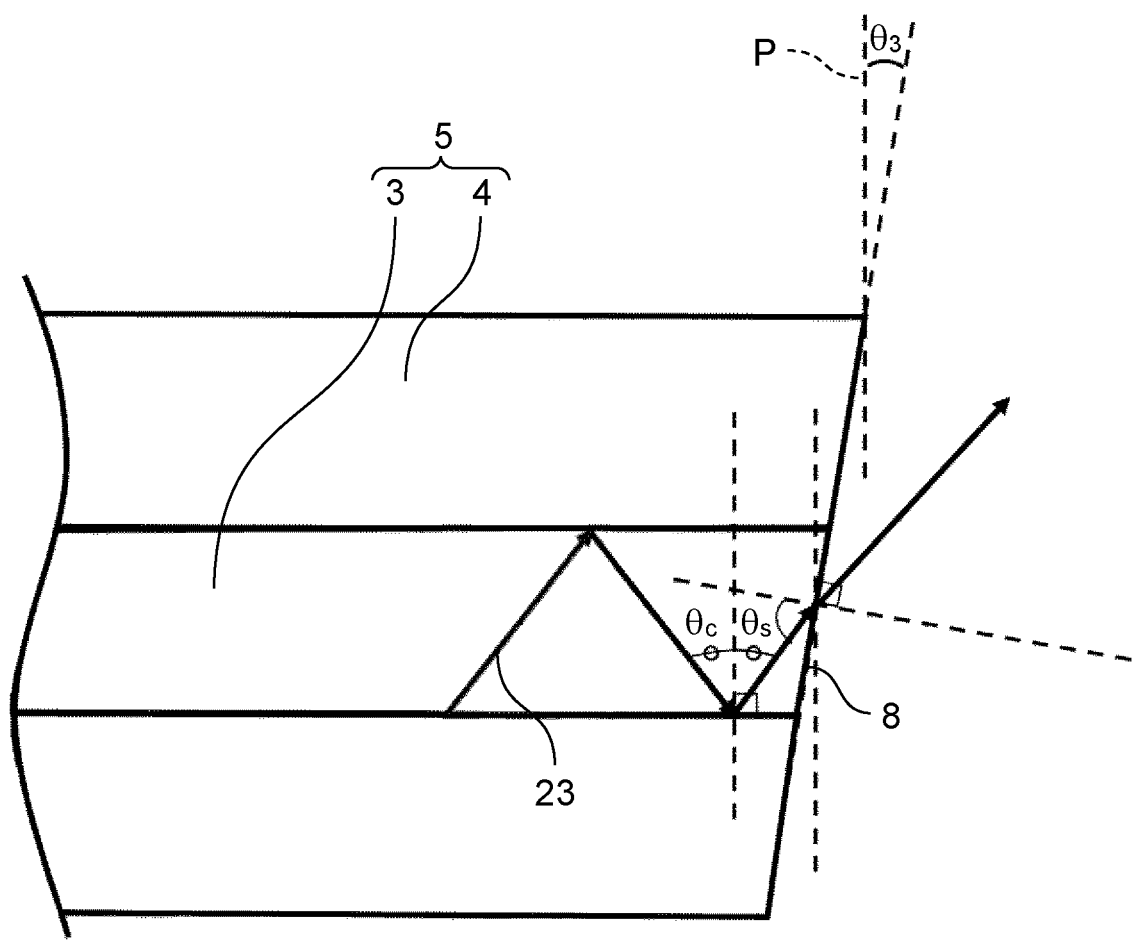
FIG. 5 is a schematic cross-sectional view illustrating an emission end surface of the waveguide structure of the light emitting device in FIG. 1.

FIG. 5 is a schematic cross-sectional view illustrating emission end surface 8 of optical waveguide 3 of waveguide structure 5 of light emitting device 1. Note that hatching that indicates a cross section is omitted in FIG. 5 merely for facilitating the viewability of the drawing.

In FIG. 5, it is conceivable to suppress the amount of light 6 reflected by emission end surface 8 and returning into optical waveguide 3 in order to increase the amount of light 6 emitted from emission end surface 8 after propagation in optical waveguide 3. In the present exemplary embodiment, regarding outer edge 23 having a minimum incident angle from optical waveguide 3 to exterior part 4 out of light 6 propagating in optical waveguide 3, the incident angle from optical waveguide 3 to exterior part 4 is denoted by $\theta_c$. Similarly to FIG. 3, $\theta_c=90°-\arcsin\{\sin(\theta_1+\varphi_1/2-\theta_2)/n_2\}-\theta_2$. An incident angle of outer edge 23 of light 6 with respect to emission end surface 8 is denoted by $\theta_s$. Then, $\theta_s$ is expressed by $\theta_s=90°-(\theta_c-\theta_3)$. A condition that outer edge 23 of light 6 is emitted to the outside of waveguide structure 5 without being totally and internally reflected by emission end surface 8 is $\theta_s<\arcsin(1/n_2)$. When $90°-(\theta_c-\theta_3)$ substitutes for $\theta_s$, $90°-\theta_c+\theta_3<\arcsin(1/n_2)$. When this expression is solved for $\theta_3$, the following Formula (3) is obtained.

$$\theta_3 < \arcsin\left(\frac{1}{n_2}\right) - \arcsin\left\{\frac{\sin\left(\theta_1 + \frac{\varphi_1}{2} - \theta_2\right)}{n_2}\right\} - \theta_2 \quad \text{Formula (3)}$$

From the above, $\theta_3$ satisfies the above Formula (3) when the refractive index of optical waveguide 3 is denoted by $n_2$, the first predetermined angle is denoted by $\theta_1$, the second predetermined angle is denoted by $\theta_2$, the third predetermined angle is denoted by $\theta_3$, and the apex angle of the light flux of light 6 converged on incident end surface 7 by converging optical system 20 in the predetermined plane is denoted by $\varphi_1$.

As described above, light emitting device 1 includes light source 2, waveguide structure 5, and converging optical system 20, and further includes support 30 that supports light source 2, waveguide structure 5, and converging optical system 20. In the present exemplary embodiment, light source 2, waveguide structure 5, and converging optical system 20 are mounted on support 30, thereby defining mutual positional relationships.

Support 30 in FIG. 1 includes first mounting member 12, second mounting member 13, base 14, height adjustment member 15, first positioning guide 16, and second positioning guide 17.

First mounting member 12 is disposed on disposition surface 14a of base 14. Light source 2 and converging optical system 20 are installed on a surface (upper surface in FIG. 1) of first mounting member 12 on a side opposite to base 14. First mounting member 12 is made of a material having high thermal conductivity, and accordingly, and accordingly, heat of light source 2 can be transmitted to base 14 and dissipated. In this manner, first mounting member 12 has a height adjustment function and a cooling function.

Second mounting member 13 is disposed on disposition surface 14a of base 14. Waveguide structure 5 is disposed on a surface (upper surface in FIG. 1) of second mounting member 13 on a side opposite to base 14. Second mounting member 13 is made of a material having high thermal conductivity, and accordingly, heat of waveguide structure 5 can be transmitted to base 14 and dissipated. In this manner, second mounting member 13 has a height adjustment function and a cooling function.

Height adjustment member 15 is disposed between disposition surface 14a of base 14 and first mounting member 12. Height adjustment member 15 is a mechanism that adjusts a height of first mounting member 12 from disposition surface 14a of base 14, and is a mechanism for installation in which optical axis 11 of light 6 is inclined with respect to length direction A of optical waveguide 3. A surface (upper surface in FIG. 1) of height adjustment member 15 on a side opposite to disposition surface 14a is inclined at first predetermined angle $\theta_1$ with respect to disposition surface 14a of base 14. As a result, an angle of light 6 emitted from light source 2 in length direction A of optical waveguide 3 with respect to optical axis 11 also becomes $\theta_i$. Height adjustment member 15 has, for example, a wedge shape. Height adjustment member 15 is an angle adjustment member that inclines optical axis 11 of light 6 at first predetermined angle $\theta_1$ with respect to length direction A of optical waveguide 3 in the predetermined plane.

With height adjustment member 15, first positioning guide 16 and second positioning guide 17 form a position adjustment member that moves light source 2 in a state where the angle between optical axis 11 of light 6 and length direction A of optical waveguide 3 in the predetermined plane is maintained at first predetermined angle $\theta_i$. The position adjustment member is a translation assisting member configured to move light source 2 in parallel. First positioning guide 16 is installed on an end surface of first mounting member 12 facing waveguide structure 5. Second positioning guide 17 is installed on an end surface of first mounting member 12 on a side opposite to waveguide structure 5. A surface of first positioning guide 16 in contact with first mounting member 12 is inclined at second predetermined angle $\theta_2$ with respect to vertical plane P perpendicular to length direction A of optical waveguide 3. Similarly, a surface of second positioning guide 17 in contact with first mounting member 12 is also inclined at second predetermined angle $\theta_2$ with respect to vertical plane P perpendicular to length direction A of optical waveguide 3.

When height adjustment member 15 is moved along disposition surface 14a of base 14 in a direction approaching waveguide structure 5 or in a direction (length direction A of optical waveguide 3) separating from waveguide structure 5, light source 2 moves along first positioning guide 16 and second positioning guide 17 in the state where the angle between optical axis 11 of light 6 and length direction A of optical waveguide 3 in the predetermined plane is maintained at first predetermined angle $\theta_i$. As a result, emission surface 2b of light source 2 can be moved in the state where the angle between optical axis 11 of light 6 and length direction A of optical waveguide 3 in the predetermined plane is maintained at first predetermined angle $\theta_1$ in a state of keeping a distance between emission surface 2b of light source 2 and incident end surface 7, that is, a state of keeping a size of region R on which light 6 is incident in waveguide structure 5. Therefore, it is easy to adjust a position where light 6 is efficiently incident on incident end surface 7.

First convex lens 9 and second convex lens 10 of converging optical system 20, and height adjustment member 15 are subjected to position adjustment such that the amount of light 6 converted to a predetermined wavelength by waveguide structure 5 is maximized, and then, are fixed to first mounting member 12 and base 14 by fixing units such as adhesives 18a, 18b, 18c. In FIG. 1, first convex lens 9 and second convex lens 10 are fixed to first mounting member 12 by adhesives 18a, 18b, and height adjustment member 15 is fixed to base 14 by adhesive 18c. Adhesives 18a, 18b, 18c are not immediately cured even after members to be attached are installed at an attachment position and applied, and the position adjustment can be performed. Adhesives 18a, 18b, 18c are, for example, ultraviolet curable resins.

Next, a method of mounting light source 2, converging optical system 20, and waveguide structure 5 on support 30 will be described. First, waveguide structure 5 is mounted on second mounting member 13. Next, second mounting member 13 is installed and fixed onto disposition surface 14*a* of base 14. Light source 2 and converging optical system 20 are mounted on first mounting member 12. At this point in time, first convex lens 9 and second convex lens 10 of converging optical system 20 are not fixed. Next, height adjustment member 15 is installed on disposition surface 14*a* of base 14. First mounting member 12 is placed on height adjustment member 15. First mounting member 12 and height adjustment member 15 are not fixed. Next, an ultraviolet curable resin is applied as adhesives 18*a*, 18*b*, 18*c*. First convex lens 9, second convex lens 10, and height adjustment member 15 are not fixed. Thereafter, first positioning guide 16 and second positioning guide 17 are installed and fixed onto disposition surface 14*a* of base 14. Thereafter, an electrical system is connected to light source 2 such that light 6 is emitted from light source 2. In this state, fine position adjustment of first convex lens 9 and second convex lens 10 is performed such that light 6 converges the most in a plane including incident end surface 7. Thereafter, height adjustment member 15 is moved in the direction approaching waveguide structure 5 or the direction (length direction A of optical waveguide 3) separating from waveguide structure 5 to perform the fine position adjustment such that the amount of light 6 emitted from emission end surface 8 is maximized. That is, converging optical system 20 is adjusted such that region R on which light 6 is incident falls within incident end surface 7. After the position adjustment, ultraviolet rays are emitted to cure adhesives 18*a*, 18*b*, 18*c*, thereby fixing first convex lens 9, second convex lens 10, first mounting member 12, and height adjustment member 15. As a result, light emitting device 1 illustrated in FIG. 1 is obtained.

[1.1.3 Effects, etc.]

As described above, light emitting device 1 includes: light source 2 that emits light 6 having directionality; and waveguide structure 5 including optical waveguide 3 that has incident end surface 7 and emission end surface 8, converts the wavelength of light 6 incident from incident end surface 7, and emits light 6 from emission end surface 8, and exterior part 4 that is optically transparent and covers optical waveguide 3 such that incident end surface 7 and emission end surface 8 are exposed. Optical waveguide 3 extends in length direction A. Length direction A of optical waveguide 3 is inclined at a predetermined angle with respect to optical axis 11 of light 6 in a predetermined plane including length direction A of optical waveguide 3 and optical axis 11 of light 6. The predetermined angle is set such that light 6 propagates in optical waveguide 3 while being totally and internally reflected at boundary surface B between optical waveguide 3 and exterior part 4. According to this configuration, damage to light source 2 can be reduced, and further, the utilization efficiency and the wavelength conversion efficiency of light 6 can be improved.

In light emitting device 1, light 6 has an intensity distribution in a radial direction orthogonal to optical axis 11. Light 6 has beams 61 defined in a range from a peak intensity of light 6 to an intensity of $1/e^2$ of the peak intensity of light 6, inclusive. Beams 61 converge within incident end surface 7. That is, region R corresponding to the cross section of the beams defined by $1/e^2$ of the peak intensity of light 6 incident on end surface 5*a* of waveguide structure 5 falls within incident end surface 7. According to this configuration, the utilization efficiency of light 6 can be improved.

In addition, light emitting device 1 further includes converging optical system 20 that is disposed on optical axis 11 of light 6 and converges light 6 on incident end surface 7. According to this configuration, the utilization efficiency and the wavelength conversion efficiency of light 6 can be improved.

In addition, when the refractive index of exterior part 4 is denoted by $n_1$, the refractive index of optical waveguide 3 is denoted by $n_2$, the predetermined angle is denoted by $\theta_1$, the angle between incident end surface 7 and vertical plane P perpendicular to length direction A of optical waveguide 3 in the predetermined plane is denoted by $\theta_2$, and the apex angle of the light flux of light 6 converging on incident end surface 7 by converging optical system 20 in the predetermined plane is denoted by $\varphi_1$ in light emitting device 1, $\theta_1$ satisfies $$\theta_1 \leq \arcsin\left[n_2 \cdot \sin\left\{90° - \theta_2 - \arcsin\left(\frac{n_1}{n_2}\right)\right\}\right] - \frac{\varphi_1}{2} + \theta_2.$$

According to this configuration, the wavelength conversion efficiency of light 6 can be improved.

In addition, incident end surface 7 in light emitting device 1 partially reflects beams 61 of light 6 to generate reflected beams. The predetermined angle is set such that the reflected beams are not incident on light source 2. According to this configuration, it is possible to prevent light source 2 from being damaged.

In addition, when the effective radius of converging optical system 20 is denoted by r, the distance from incident end surface 7 to converging optical system 20 is represented by x, the predetermined angle is denoted by $\theta_1$, the angle between incident end surface 7 and vertical plane P perpendicular to length direction A of optical waveguide 3 in the predetermined plane is denoted by $\theta_2$, and the apex angle of the light flux of light 6 converging on incident end surface 7 by converging optical system 20 in the predetermined plane is denoted by $\varphi_1$ in light emitting device 1, $\theta_1$ satisfies $$\theta_1 > \frac{2\theta_2 + \frac{\varphi_1}{2} + \arctan\left(\frac{r}{x}\right)}{2}.$$

According to this configuration, the damage to light source 2 can be reduced.

In addition, converging optical system 20 in light emitting device 1 is configured such that the component located closest to incident end surface 7 is the converging lens (second convex lens 10). The effective radius is the radius of the converging lens. The distance from incident end surface 7 to converging optical system 20 is the distance from incident end surface 7 to the converging lens. According to this configuration, the damage to light source 2 can be reduced.

In addition, emission end surface 8 in light emitting device 1 is inclined with respect to vertical plane P in the predetermined plane. According to this configuration, the utilization efficiency of light 6 can be improved.

In addition, when the refractive index of optical waveguide 3 is denoted by $n_2$, the predetermined angle is denoted by $\theta_1$, the angle between incident end surface 7 and vertical plane P perpendicular to length direction A of optical waveguide 3 in the predetermined plane is denoted by $\theta_2$, the angle at which emission end surface 8 is inclined with respect to vertical plane P in the predetermined plane is denoted by $\theta_3$, and the apex angle of the light flux of light 6 converging on incident end surface 7 by converging optical system 20 in the predetermined plane is denoted by $\varphi_1$ in light emitting device 1, $\theta_3$ satisfies $$\theta_3 < \arcsin\left(\frac{1}{n_2}\right) - \arcsin\left\{\frac{\sin\left(\theta_1 + \frac{\varphi_1}{2} - \theta_2\right)}{n_2}\right\} - \theta_2.$$

According to this configuration, the utilization efficiency of light 6 can be improved.

In addition, light emitting device 1 further includes the angle adjustment member (height adjustment member 15) that inclines optical axis 11 of light 6 at the predetermined angle with respect to length direction A of optical waveguide 3 in the predetermined plane; and the position adjustment member (height adjustment member 15, first and second positioning guides 16, 17) that moves at least one of light source 2 and waveguide structure 5 in the state where the angle between optical axis 11 of light 6 and length direction A of optical waveguide 3 in the predetermined plane is maintained at the predetermined angle and the distance between emission surface 2b of light source 2 and incident end surface 7 is kept constant. According to this configuration, the positional relationship between light source 2 and waveguide structure 5 can be easily set.

In addition, light emitting device 1 further includes base 14 having disposition surface 14a on which light source 2 and waveguide structure 5 are disposed. Optical axis 11 of light 6 of light source 2 is inclined with respect to a creepage direction of disposition surface 14a of base 14 in the predetermined plane. According to this configuration, the positional relationship between light source 2 and waveguide structure 5 can be easily set.

In addition, waveguide structure 5 in light emitting device 1 is the optical waveguide SHG element. According to this configuration, the wavelength conversion efficiency of light 6 can be improved.

A manufacturing method for light emitting device 1 described above includes setting the predetermined angle such that light 6 propagates in optical waveguide 3 while being totally and internally reflected at boundary surface B between optical waveguide 3 and exterior part 4. Optical waveguide 3 extends in length direction A. The predetermined angle is the angle between length direction A of optical waveguide 3 and optical axis 11 of light 6 in the predetermined plane including length direction A of optical waveguide 3 and optical axis 11 of light 6. According to this configuration, the utilization efficiency and the wavelength conversion efficiency of light 6 can be improved.

In addition, the manufacturing method includes determining positions of light source 2 and waveguide structure 5 such that the amount of light 6 emitted from emission end surface 8 of waveguide structure 5 is maximized by moving at least one of light source 2 and waveguide structure 5 by the position adjustment member. According to this configuration, the positional relationship between light source 2 and waveguide structure 5 can be easily set.

Waveguide structure 5 described above includes: optical waveguide 3 that has incident end surface 7 and emission end surface 8, converts a wavelength of light 6, which has directionality and is incident from incident end surface 7, and emits light 6 from emission end surface 8; and exterior part 4 that is optically transparent and covers optical waveguide 3 such that incident end surface 7 and emission end surface 8 are exposed. Optical waveguide 3 extends in length direction A. Length direction A of optical waveguide 3 is inclined at a predetermined angle with respect to optical axis 11 of light 6 in a predetermined plane including length direction A of optical waveguide 3 and optical axis 11 of light 6. The predetermined angle is set such that light 6 propagates in optical waveguide 3 while being totally and internally reflected at boundary surface B between optical waveguide 3 and exterior part 4. According to this configuration, the utilization efficiency and the wavelength conversion efficiency of light 6 can be improved.

1.2 Second Exemplary Embodiment

[1.2.1 Configuration]

Figure 6:
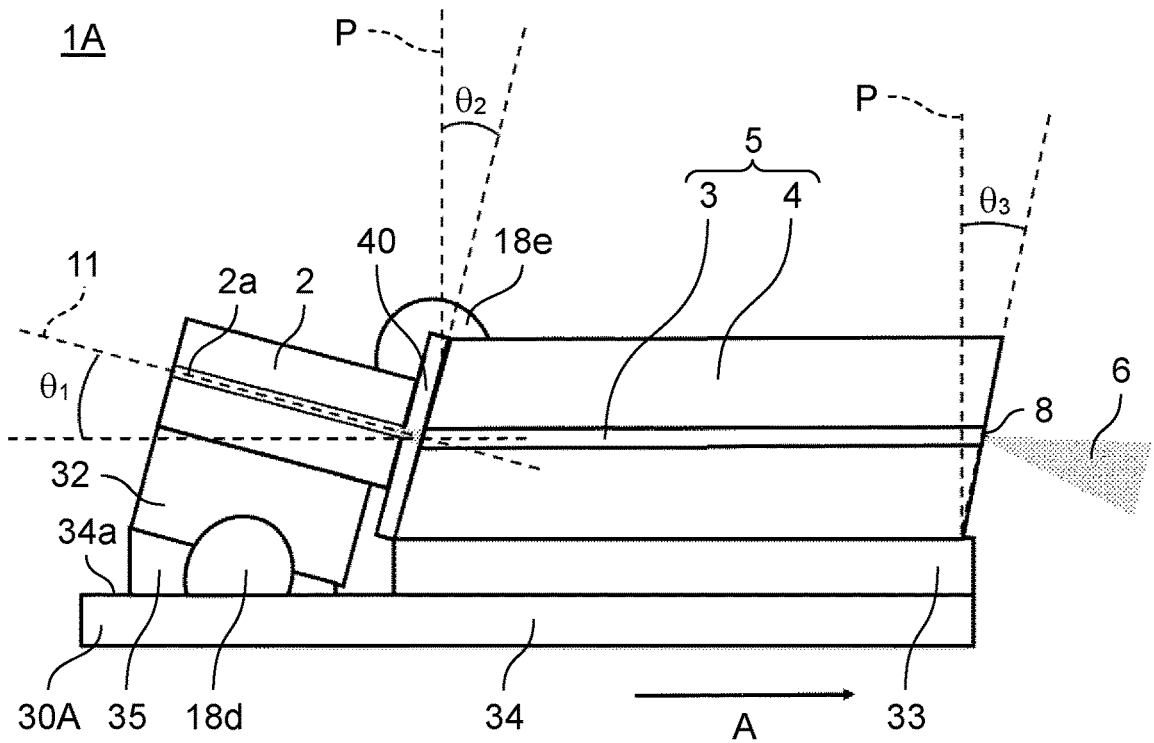
FIG. 6 is a schematic side view of a configuration example of a light emitting device of a second exemplary embodiment.

FIG. 6 is a schematic side view of a configuration example of light emitting device 1A of a second exemplary embodiment. Light emitting device 1A in FIG. 6 includes light source 2 and waveguide structure 5 similarly to light emitting device 1 of the first exemplary embodiment.

Light emitting device 1A of FIG. 6 further includes antireflection film 40 disposed between light source 2 and optical waveguide 3, instead of including converging optical system 20. First surface 40a of antireflection film 40 in a thickness direction is in contact with emission surface 2b of light source 2. Second surface 40b of antireflection film 40 in the thickness direction is in contact with incident end surface 7 of optical waveguide 3. As a result, light source 2 is directly coupled to waveguide structure 5 through antireflection film 40 interposed therebetween. Note that antireflection film 40 has a uniform thickness in the present exemplary embodiment. Therefore, the angle (second predetermined angle $\theta_2$) formed by incident end surface 7 and vertical plane P perpendicular to length direction A of optical waveguide 3 in the predetermined plane is equal to first predetermined angle $\theta_1$. That is, emission surface 2b of light source 2 and incident end surface 7 of optical waveguide 3 are parallel to each other.

Antireflection film 40 in FIG. 6 transmits light 6. In the present exemplary embodiment, light 6 is not converged by converging optical system 20, such as a lens, but enters optical waveguide 3 from incident end surface 7 as light that travels while diverging. Antireflection film 40 is, for example, a single-layer film made of a material having a lower refractive index than optical waveguide 3. Examples of the material of antireflection film 40 include magnesium fluoride, calcium fluoride, quartz glass, and sapphire. Antireflection film 40 suppresses light 6 from light source 2 from returning to active layer 2a of light source 2.

Length direction A of optical waveguide 3 in light emitting device 1A of FIG. 6 is inclined at the first predetermined angle (indicated by $\theta_1$ in FIG. 6) with respect to optical axis 11 of light 6 in the predetermined plane including length direction A of optical waveguide 3 and optical axis 11 of light 6. As a result, a length of an optical path along which light 6 propagates in optical waveguide 3 while being reflected by boundary surface B between optical waveguide 3 and exterior part 4 is longer than a length of optical waveguide 3, and thus, the wavelength conversion efficiency increases.

Hereinafter, a relationship between first predetermined angle $\theta_1$ and second predetermined angle $\theta_2$ will be further described.

In light emitting device 1A of FIG. 6, first predetermined angle $\theta_1$ and second predetermined angle $\theta_2$ are set such that light 6 propagates in optical waveguide 3 while being totally and internally reflected at boundary surface B between optical waveguide 3 and exterior part 4. As a result, light 6 can propagate more efficiently without leaking from optical waveguide 3 to exterior part 4. Next, the relationship between first predetermined angle $\theta_1$ and second predetermined angle $\theta_2$ will be described with reference to FIG. 7.

Figure 7:
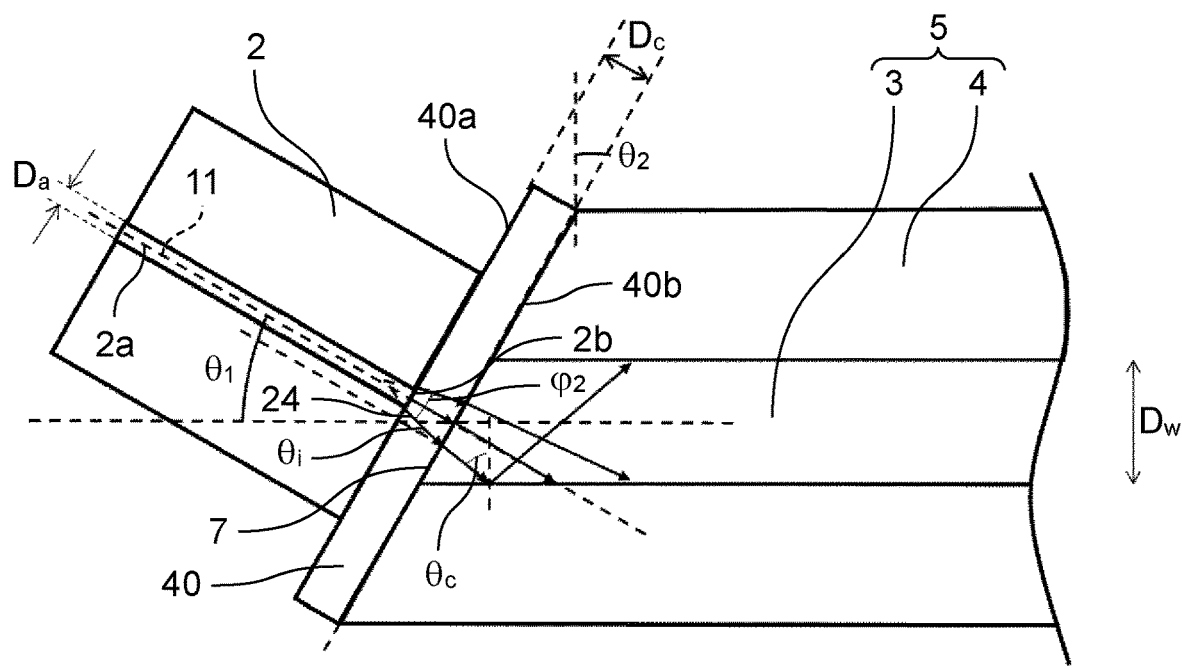
FIG. 7 is a schematic cross-sectional view illustrating an incident end surface of a waveguide structure of the light emitting device in FIG. 6.
Figure 8:
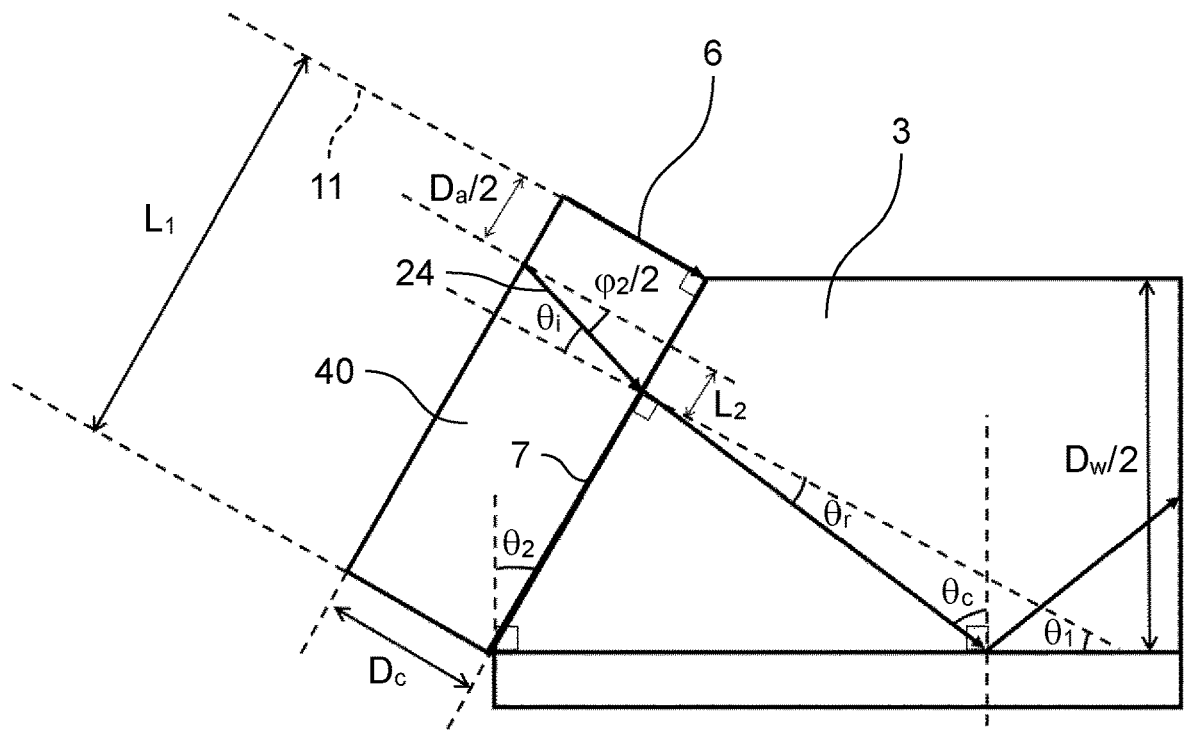
FIG. 8 is a schematic cross-sectional view illustrating the incident end surface of the waveguide structure of the light emitting device in FIG. 6.

FIGS. 7 and 8 are schematic cross-sectional views illustrating incident end surface 7 of waveguide structure 5 of light emitting device 1A. Note that hatching that indicates a cross section is omitted in FIGS. 7 and 8 merely for facilitating the viewability of the drawing.

In FIG. 7, light 6 emitted from emission surface 2b of active layer 2a of light source 2 passes through antireflection film 40 and enters optical waveguide 3 from incident end surface 7. It is desirable that light 6 entering optical waveguide 3 be totally and internally reflected at boundary surface B between optical waveguide 3 and exterior part 4 and travel in the length direction of optical waveguide 3 in order to efficiently propagate without leaking out of optical waveguide 3. In the present exemplary embodiment, light 6 is incident on incident end surface 7 while diverging, and thus, outer edge 24 of beams 61 of light 6 in FIG. 7 has a minimum incident angle with respect to exterior part 4. First predetermined angle $\theta_1$ and second predetermined angle $\theta_2$ are set to satisfy a condition that not a central ray passing through the optical axis of light 6 but outer edge 24 of light 6 is totally and internally reflected at boundary surface B between optical waveguide 3 and exterior part 4. In FIG. 8, the incident angle of outer edge 24 of light 6 on incident end surface 7 in the predetermined plane is denoted by $\theta i$, and a divergence angle of a light flux of light 6 in antireflection film 40 in the predetermined plane is denoted by $\varphi_2$. In this case, $\theta_i = \varphi_2/2$. When a refractive index of exterior part 4 is denoted by $n_1$, the refractive index of optical waveguide 3 is denoted by $n_2$, the refractive index of antireflection film 40 is denoted by $n_3$, and a refraction angle is denoted by $\theta_r$, $\sin(\theta_i)/\sin(\theta_r) = n_2/n_3$ holds according to Snell's law. Then, $\theta_r = \arcsin\{\sin(\varphi_2/2)\cdot n_3/n_2\}$ since $\sin(\theta_r) = \sin(\varphi_2/2)\cdot n_3/n_2$. When the incident angle of outer edge 24 of light 6 from optical waveguide 3 to exterior part 4 is denoted by $\theta_c$, $\theta_c = 90° - \theta_1 - \arcsin\{\sin(\varphi_2/2)\cdot n_3/n_2\}$ since $\theta_c = 180° - 90° - \theta_1 - \theta_r$. The condition that outer edge 24 of light 6 is totally and internally reflected at boundary surface B between optical waveguide 3 and exterior part 4 is $\theta_c \geq \arcsin(n_1/n_2)$. Thus, when the formula of $90° - \theta_1 - \arcsin\{\sin(\varphi_2/2)\cdot n_3/n_2\} \geq \arcsin(n_1/n_2)$ is solved for $\theta_1$, the following Formula (4) is obtained.

$$\theta_1 \leq 90° - \arcsin\left\{\frac{\sin\left(\frac{\varphi_2}{2}\right)\cdot n_3}{n_2}\right\} - \arcsin\left(\frac{n_1}{n_2}\right) \quad \text{Formula (4)}$$

In light emitting device 1A, emission surface 2b of light source 2 and incident end surface 7 of optical waveguide 3 are parallel to each other, and optical axis 11 of light 6 and incident end surface 7 of optical waveguide 3 are perpendicular to each other, and thus, first predetermined angle $\theta_1$ and second predetermined angle $\theta_2$ are equal to each other.

From the above, $\theta_1$ satisfies the above Formula (4) when the refractive index of exterior part 4 is denoted by $n_1$, the refractive index of optical waveguide 3 is denoted by $n_2$, the refractive index of antireflection film 40 is denoted by $n_3$, the first predetermined angle is denoted by $\theta_1$, and the divergence angle of the light flux of light 6 in antireflection film 40 in the predetermined plane is denoted by $\varphi_2$ in light emitting device 1A of the present exemplary embodiment.

In light emitting device 1A of FIG. 6, emission end surface 8 of in waveguide structure 5 is inclined at third predetermined angle $\theta_3$ with respect to vertical plane P in the predetermined plane, which is similar to light emitting device 1. First predetermined angle $\theta_1$, second predetermined angle $\theta_2$, and third predetermined angle $\theta_3$ are set such that light 6 that tries to exit through emission end surface 8 from the inside of optical waveguide 3 is not totally and internally reflected by emission end surface 8. As a result, a possibility that light 6 is confined in optical waveguide 3 is reduced, and the utilization efficiency of light 6 can be improved. Next, a relationship among first predetermined angle $\theta_1$, second predetermined angle $\theta_2$, and third predetermined angle $\theta_3$ will be described with reference to FIG. 5.

In FIG. 5, it is conceivable to suppress the amount of light 6 reflected by emission end surface 8 and returning into optical waveguide 3 in order to increase the amount of light 6 emitted from emission end surface 8 after propagation in optical waveguide 3. In the present exemplary embodiment, regarding outer edge 23 having a minimum incident angle from optical waveguide 3 to exterior part 4 out of light 6 propagating in optical waveguide 3, the incident angle from optical waveguide 3 to exterior part 4 is denoted by $\theta_c$. In the present exemplary embodiment, $\theta_c = 90° - \theta_1 - \arcsin\{\sin(\varphi_2/2)\cdot n_3/n_2\}$. An incident angle of outer edge 23 of light 6 with respect to emission end surface 8 is denoted by $\theta_s$. Then, $\theta_s$ is expressed by $\theta_s = 90° - (\theta_c - \theta_3)$. A condition that outer edge 23 of light 6 is emitted to the outside of waveguide structure 5 without being totally and internally reflected by emission end surface 8 is $\theta_s < \arcsin(1/n_2)$. When $90° - (\theta_c - \theta_3)$ substitutes for $\theta_s$, $90° - \theta_c + \theta_3 < \arcsin(1/n_2)$. When this expression is solved for $\theta_3$, the following Formula (5) is obtained.

$$\theta_3 \leq \arcsin\left(\frac{1}{n_2}\right) - \arcsin\left\{\frac{\sin\left(\frac{\varphi_2}{2}\right)\cdot n_3}{n_2}\right\} - \theta_1 \quad \text{Formula (5)}$$

From the above, $\theta_3$ satisfies the above Formula (5) when the refractive index of optical waveguide 3 is denoted by $n_2$, the refractive index of antireflection film 40 is denoted by $n_3$, the first predetermined angle is denoted by $\theta_1$, the third predetermined angle is denoted by $\theta_3$, and the divergence angle of the light flux of light 6 in antireflection film 40 in the predetermined plane is denoted by $\varphi_2$.

Light 6 has an intensity distribution in a radial direction orthogonal to optical axis 11. Light 6 has beams 61 defined in a range from a peak intensity of light 6 to an intensity of $1/e^2$ of the peak intensity of light 6, inclusive. In light emitting device 1A of FIG. 6, the thickness of antireflection film 40 is set such that all the beams 61 are incident on incident end surface 7. As a result, the utilization efficiency of light 6 can be improved. Next, the thickness of antireflection film 40 will be described with reference to FIGS. 7 and 8.

In FIGS. 7 and 8, light 6 emitted from emission surface 2b of active layer 2a of light source 2 passes through antireflection film 40 and enters optical waveguide 3 from incident end surface 7. In FIGS. 7 and 8, a dimension of optical waveguide 3 in a direction orthogonal to length direction A of optical waveguide 3 in the predetermined plane, that is, a thickness of optical waveguide 3 is denoted by $D_w$. A dimension of incident end surface 7 of optical waveguide 3 in a direction perpendicular to optical axis 11 of light 6 in the predetermined plane is denoted by $L_1$. In this case, $L_1 = D_w/2\cdot\sin(90° - \theta_2)$ holds. Since $\theta_2 = \theta_1$ as described above in the present exemplary embodiment, $L_1 = D_w/2\cdot\sin(90° - \theta_1)$. In FIG. 8, a length of outer edge 24 of light 6 on incident end surface 7 diverging in antireflection film 40 is denoted by $L_2$.

The length $L_2$ is a distance by which outer edge 24 of light 6 moves in the direction orthogonal to length direction A of optical waveguide 3 in the predetermined plane when outer edge 24 of light 6 passes through antireflection film 40. The thickness of antireflection film 40 is denoted by $D_c$, and the divergence angle of the light flux of light 6 in antireflection film 40 in the predetermined plane is denoted by $\varphi_2$. In this case, $L_2 = D_c \cdot \tan(\varphi_2/2)$ holds. A dimension of emission surface 2b of light source 2 in the direction orthogonal to optical axis 11 of light 6 in the predetermined plane, that is, a thickness of active layer 2a is denoted by $D_a$. In this case, a condition that beams 61 of light 6 are incident on incident end surface 7 without leakage is $L_2 \leq L_1 - D_a/2$. Thus, $D_c \cdot \tan(\varphi_2/2) \leq D_w/2 \cdot \sin(90° - \theta_1) - D_a/2$. When this expression is solved for $D_c$, the following Formula (6) is obtained.

$$D_c \leq \frac{\left\{\dfrac{D_w}{2\sin(90° - \theta_1)} - \dfrac{D_a}{2}\right\}}{\tan\left(\dfrac{\varphi_2}{2}\right)} \quad \text{Formula (6)}$$

From the above, $D_c$ satisfies the above Formula (6) when the dimension of optical waveguide 3 in the direction orthogonal to length direction A of optical waveguide 3 in the predetermined plane is denoted by $D_w$, the dimension of emission surface 2b of light source 2 in the direction orthogonal to optical axis 11 of light 6 in the predetermined plane is denoted by $D_a$, the thickness of antireflection film 40 is denoted by $D_c$, the first predetermined angle is denoted by $\theta_1$, and the divergence angle of the light flux of light 6 in antireflection film 40 is denoted by $\varphi_2$.

The thickness $D_c$ of antireflection film 40 is preferably a thickness suitable for industrial formation while satisfying the above Formula (6). The thickness $D_c$ of antireflection film 40 is, for example, larger than 50 nm and smaller than 2500 nm.

As described above, light emitting device 1A includes light source 2, waveguide structure 5, and antireflection film 40. Light emitting device 1A further includes support 30A that supports light source 2, waveguide structure 5, and antireflection film 40. In the present exemplary embodiment, light source 2, waveguide structure 5, and antireflection film 40 are mounted on support 30A, thereby defining mutual positional relationships.

Support 30A in FIG. 6 includes first mounting member 32, second mounting member 33, base 34, and height adjustment member 35.

First mounting member 32 is disposed on disposition surface 34a of base 34. Light source 2 is installed on a surface (upper surface in FIG. 6) of first mounting member 32 on a side opposite to base 34. First mounting member 32 is made of a material having high thermal conductivity, and accordingly, and accordingly, heat of light source 2 can be transmitted to base 34 and dissipated. In this manner, first mounting member 32 has a height adjustment function and a cooling function.

Second mounting member 33 is disposed on disposition surface 34a of base 34. Waveguide structure 5 is disposed on a surface (upper surface in FIG. 6) of second mounting member 33 on a side opposite to base 34. Second mounting member 33 is made of a material having high thermal conductivity, and accordingly, heat of waveguide structure 5 can be transmitted to base 34 and dissipated. In this manner, second mounting member 33 has a height adjustment function and a cooling function.

Height adjustment member 35 is disposed between disposition surface 34a of base 34 and first mounting member 32. Height adjustment member 35 is a mechanism that adjusts a height of first mounting member 32 from disposition surface 34a of base 34, and is a mechanism for installation in which optical axis 11 of light 6 is inclined with respect to length direction A of optical waveguide 3. A surface (upper surface in FIG. 6) of height adjustment member 35 on a side opposite to disposition surface 34a is inclined at first predetermined angle $\theta_1$ with respect to disposition surface 34a of base 34. As a result, an angle of light 6 emitted from light source 2 in length direction A of optical waveguide 3 with respect to optical axis 11 also becomes $\theta_i$. Height adjustment member 35 has, for example, a wedge shape. Height adjustment member 35 is an angle adjustment member that inclines optical axis 11 of light 6 at first predetermined angle $\theta_1$ with respect to length direction A of optical waveguide 3 in the predetermined plane.

With antireflection film 40, height adjustment member 35 forms a position adjustment member that moves light source 2 in a state where the angle between optical axis 11 of light 6 and length direction A of optical waveguide 3 in the predetermined plane is maintained at first predetermined angle $\theta_1$ and a distance between emission surface 2b of light source 2 and incident end surface 7 is kept constant. The position adjustment member is a translation assisting member configured to move light source 2 in parallel. When height adjustment member 35 is moved along disposition surface 34a of base 34 in a direction approaching waveguide structure 5 or in a direction (length direction A of optical waveguide 3) separating from waveguide structure 5, light source 2 moves along antireflection film 40 in the state where the angle between optical axis 11 of light 6 and length direction A of optical waveguide 3 in the predetermined plane is maintained at first predetermined angle $\theta_i$. As a result, emission surface 2b of light source 2 can be moved in the state where the angle between optical axis 11 of light 6 and length direction A of optical waveguide 3 in the predetermined plane is maintained at first predetermined angle $\theta_1$ in the state of keeping the distance between emission surface 2b of light source 2 and incident end surface 7, that is, a state of keeping a size of region R on which light 6 is incident in waveguide structure 5. Therefore, it is easy to adjust a position where light 6 is efficiently incident on incident end surface 7.

Light source 2, waveguide structure 5, and height adjustment member 35 are subjected to position adjustment such that the amount of light 6 converted to a predetermined wavelength by waveguide structure 5 is maximized, and then, are fixed by fixing units such as adhesives 18d, 18e. In FIG. 6, height adjustment member 35 is fixed to base 34 by adhesive 18d, and light source 2 and waveguide structure 5 are fixed to each other by adhesive 18e. Adhesives 18d, 18e are not immediately cured even after members are installed at approximate positions and applied, and the position adjustment can be performed. Adhesives 18d, 18e are, for example, ultraviolet curable resins.

Next, a method of mounting light source 2, waveguide structure 5, and antireflection film 40 on support 30A will be described. First, waveguide structure 5 is mounted on second mounting member 33. Next, second mounting member 33 is installed and fixed onto disposition surface 34a of base 34. Light source 2 is mounted on first mounting member 32. Next, height adjustment member 35 is installed on disposition surface 34a of base 34. First mounting member 32 is placed on height adjustment member 35. First mounting member 32 and height adjustment member 35 are not fixed.

Further, antireflection film 40 is disposed between light source 2 and waveguide structure 5. Next, an ultraviolet curable resin is applied as adhesives 18d, 18e. Light source 2 and height adjustment member 35 are not fixed. Thereafter, an electrical system is connected to light source 2 such that light 6 is emitted from light source 2. In this state, height adjustment member 35 is moved in the direction approaching waveguide structure 5 or the direction (length direction A of optical waveguide 3) separating from waveguide structure 5 to perform the fine position adjustment such that the amount of light 6 emitted from emission end surface 8 is maximized. After the position adjustment, ultraviolet rays are emitted to cure adhesives 18d, 18e, thereby fixing light source 2 and waveguide structure 5 to each other and fixing height adjustment member 35 to base 34. As a result, light emitting device 1A illustrated in FIG. 6 is obtained.

[1.2.2 Effects, etc.]

Light emitting device 1A described above further includes antireflection film 40 disposed between light source 2 and optical waveguide 3. Light source 2 has emission surface 2b from which light 6 is emitted. First surface 40a of antireflection film 40 in a thickness direction is in contact with emission surface 2b of light source 2. Second surface 40b of antireflection film 40 in the thickness direction is in contact with incident end surface 7 of optical waveguide 3. The angle (second predetermined angle $\theta_2$) formed by incident end surface 7 and vertical plane P perpendicular to length direction A of optical waveguide 3 in the predetermined plane is equal to predetermined angle $\theta_i$. According to this configuration, damage to light source 2 can be reduced, and further, the utilization efficiency and the wavelength conversion efficiency of light 6 can be improved.

In addition, when the refractive index of exterior part 4 is denoted by $n_1$, the refractive index of optical waveguide 3 is denoted by $n_2$, the refractive index of antireflection film 40 is denoted by $n_3$, the predetermined angle is denoted by $\theta_1$, and the divergence angle of the light fluxes of light 6 in antireflection film 40 in the predetermined plane is denoted by $\varphi_2$ in light emitting device 1A, $\theta_1$ satisfies $$\theta_1 \leq 90° - \arcsin\left\{\frac{\sin\left(\frac{\varphi_2}{2}\right) \cdot n_3}{n_2}\right\} - \arcsin\left(\frac{n_1}{n_2}\right).$$

According to this configuration, the wavelength conversion efficiency of light 6 can be improved.

In addition, emission end surface 8 in light emitting device 1A is inclined with respect to vertical plane P in the predetermined plane. According to this configuration, the utilization efficiency of light 6 can be improved.

In addition, when the refractive index of optical waveguide 3 is denoted by $n_2$, the refractive index of antireflection film 40 is denoted by $n_3$, the predetermined angle is denoted by $\theta_1$, the angle at which emission end surface 8 is inclined with respect to vertical plane P in the predetermined plane is denoted by $\theta_3$, and the divergence angle of the light flux of light 6 in antireflection film 40 in the predetermined plane is denoted by $\varphi_2$ in light emitting device 1A, $\theta_3$ satisfies $$\theta_3 \leq \arcsin\left(\frac{1}{n_2}\right) - \arcsin\left\{\frac{\sin\left(\frac{\varphi_2}{2}\right) \cdot n_3}{n_2}\right\} - \theta_1.$$

According to this configuration, the utilization efficiency of light 6 can be improved.

In addition, light 6 has the intensity distribution in the radial direction orthogonal to optical axis 11. Light 6 has beams 61 defined in a range from a peak intensity of light 6 to an intensity of $1/e^2$ of the peak intensity of light 6, inclusive. In light emitting device 1A, the thickness of antireflection film 40 is set such that all the beams 61 are incident on incident end surface 7. According to this configuration, the utilization efficiency of light 6 can be improved.

In addition, when the dimension of optical waveguide 3 in the direction orthogonal to length direction A of optical waveguide 3 in the predetermined plane is denoted by $D_w$, the dimension of emission surface 2b of light source 2 in the direction orthogonal to optical axis 11 of light 6 in the predetermined plane is denoted by $D_a$, the thickness of antireflection film 40 is denoted by $D_c$, the predetermined angle is denoted by $\theta_1$, and the divergence angle of the light flux of light 6 in antireflection film 40 is denoted by $\varphi_2$ in light emitting device 1A, $D_c$ satisfies $$D_C \leq \frac{\left\{\frac{D_w}{2\sin(90° - \theta_1)} - \frac{D_a}{2}\right\}}{\tan\left(\frac{\varphi_2}{2}\right)}.$$

According to this configuration, the utilization efficiency of light 6 can be improved.

In addition, the thickness of antireflection film 40 is larger than 50 nm and smaller than 2500 nm in light emitting device 1A. According to this configuration, the utilization efficiency of light 6 can be improved.

In addition, light emitting device 1A further includes height adjustment member (angle adjustment member) 35 that inclines optical axis 11 of light 6 at the predetermined angle (first predetermined angle $\theta_1$) with respect to length direction A of optical waveguide 3 in the predetermined plane. Antireflection film 40 is a part of three position adjustment member configured to move at least one of light source 2 and waveguide structure 5 in the state where the angle between optical axis 11 of light 6 and length direction A of optical waveguide 3 in the predetermined plane is maintained at the predetermined angle (first predetermined angle $\theta_1$) and the distance between emission surface 2b of light source 2 and incident end surface 7 of optical waveguide 3 is kept constant. According to this configuration, the positional relationship between light source 2 and waveguide structure 5 can be easily set.

[2. Modifications]

Exemplary embodiments of the present disclosure are not limited to the above exemplary embodiments. The above exemplary embodiments can be variously modified depending on design and the like as long as the object of the present disclosure can be achieved. Modifications of the above exemplary embodiments will be listed below. The modifications to be described below can be applied in appropriate combination.

[2.1 Modification 1]

Figure 9:
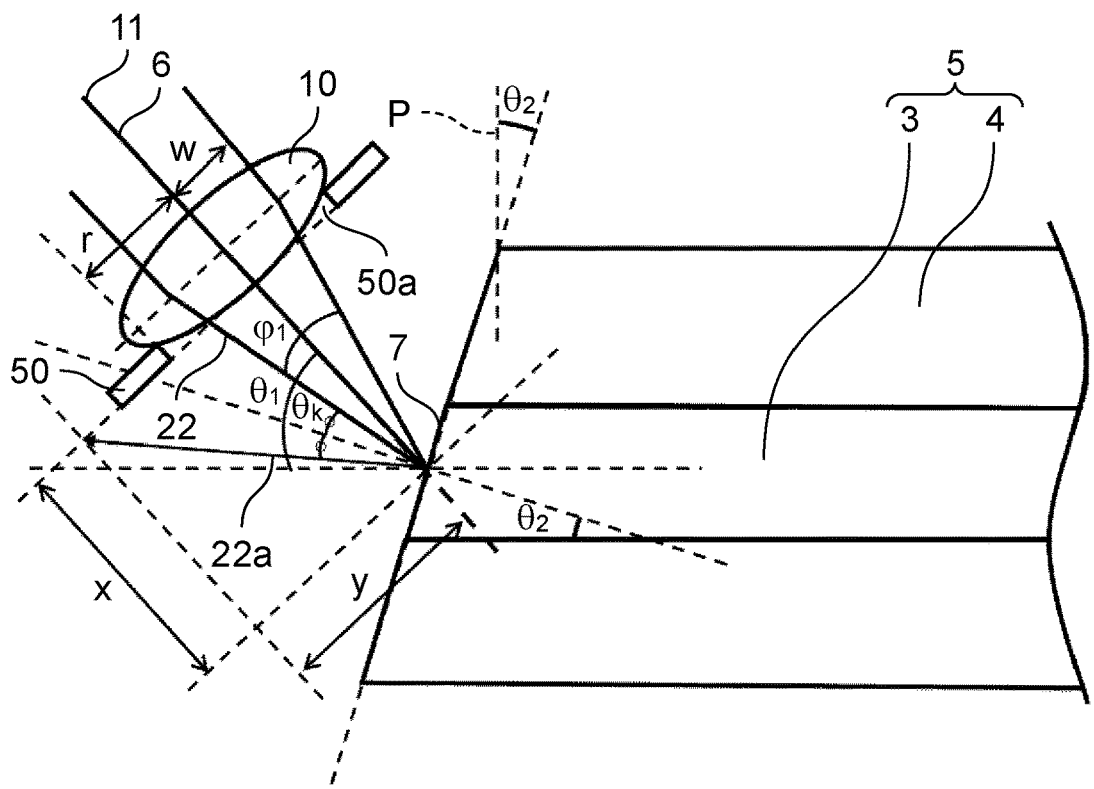
FIG. 9 is a schematic cross-sectional view illustrating an incident end surface of a waveguide structure of a light emitting device of Modification 1.

FIG. 9 is a schematic cross-sectional view of a main part of a light emitting device of Modification 1. In the first exemplary embodiment, converging optical system 20 is configured such that the component located closest to incident end surface 7 is the converging lens. In Modification 1, a converging optical system is configured such that aperture 50 is present between incident end surface 7 and a converging lens (second convex lens 10). Aperture 50 is disposed between second convex lens 10 and incident end surface 7 on optical axis 11 of light 6. Aperture 50 has opening 50a through which second convex lens 10 is exposed.

In Modification 1 as well, light 6 has beams 61 defined in a range from a peak intensity of light 6 to an intensity of $1/e^2$ of the peak intensity of light 6, inclusive. Incident end surface 7 partially reflects beams 61 to generate reflected beams. First predetermined angle $\theta_1$ and second predetermined angle $\theta_2$ are set such that the reflected beams are not incident on light source 2. In the case of Modification 1, first predetermined angle $\theta_1$ and second predetermined angle $\theta_2$ are set so as to satisfy a condition that outer edge 22 of beams 61 of light 6 does not return into opening 50a of aperture 50 after being reflected by incident end surface 7. When the effective radius of converging optical system 20 is denoted by r, the distance from incident end surface 7 to converging optical system 20 is denoted by x, the first predetermined angle is denoted by $\theta_1$, the second predetermined angle is denoted by $\theta_2$, and the apex angle of the light flux of light 6 converged on incident end surface 7 by converging optical system 20 in the predetermined plane is denoted by $\varphi_1$, $\theta_1$ may satisfy the above Formula (2) In the case of Modification 1, the distance x from incident end surface 7 to converging optical system 20 is a distance from incident end surface 7 to aperture 50. The effective radius is the radius of opening 50a of aperture 50.

As described above, converging optical system 20 is configured such that aperture 50 is present between incident end surface 7 and the converging lens. That is, converging optical system 20 is configured such that the component located closest to incident end surface 7 is aperture 50. The effective radius is the radius of opening 50a of aperture 50. The distance from incident end surface 7 to converging optical system 20 is the distance from incident end surface 7 to aperture 50. According to this configuration, the damage to light source 2 can be reduced.

[2.2 Modification 2]

Figure 10:
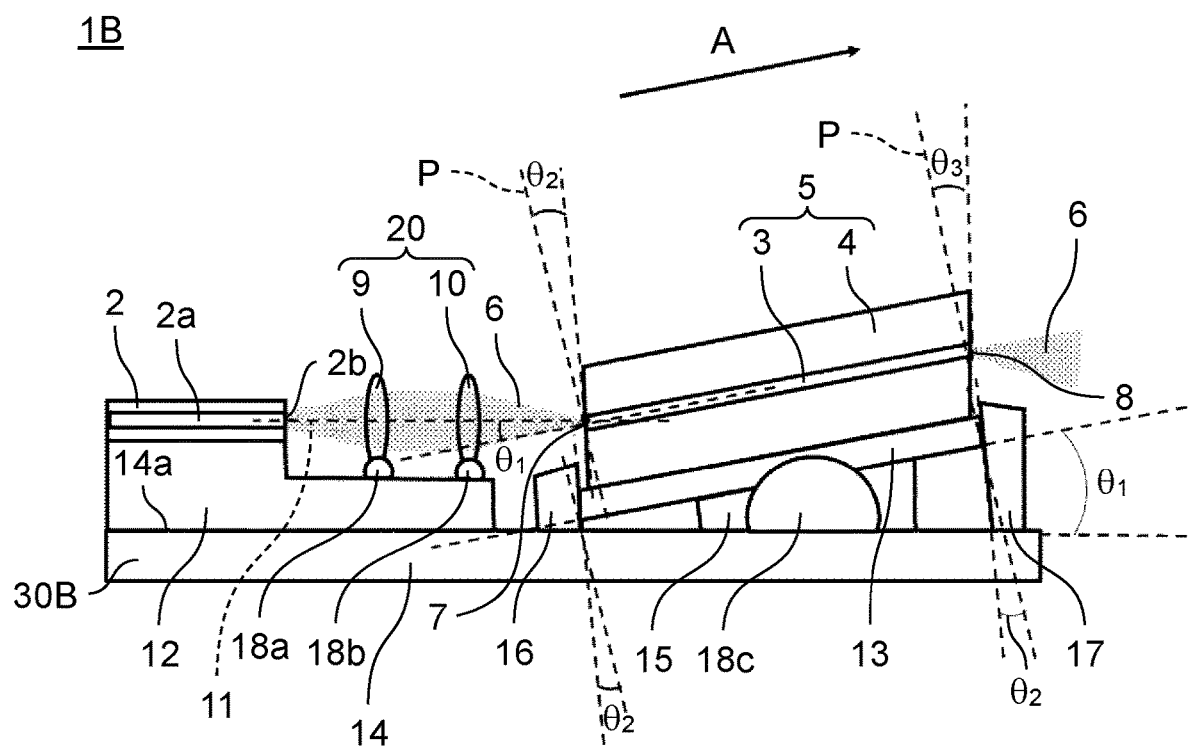
FIG. 10 is a schematic side view of a configuration example of a light emitting device of Modification 2.

FIG. 10 is a schematic side view of a configuration example of light emitting device 1B of Modification 2. Light emitting device 1B in FIG. 10 includes light source 2, waveguide structure 5, converging optical system 20, and support 30B. Light source 2, waveguide structure 5, and converging optical system 20 are mounted on support 30B, thereby defining mutual positional relationships.

Support 30B in FIG. 10 includes first mounting member 12, second mounting member 13, base 14, height adjustment member 15, first positioning guide 16, and second positioning guide 17.

Height adjustment member 15 in FIG. 10 is disposed between disposition surface 14a of base 14 and second mounting member 13. Height adjustment member 15 is a mechanism that adjusts a height of second mounting member 13 from disposition surface 14a of base 14, and is a mechanism for installation in which length direction A of optical waveguide 3 is inclined with respect to optical axis 11 of light 6. A surface (upper surface in FIG. 10) of height adjustment member 15 on a side opposite to disposition surface 14a is inclined at first predetermined angle $\theta_1$ with respect to disposition surface 14a of base 14. As a result, an angle of light 6 emitted from light source 2 in length direction A of optical waveguide 3 with respect to optical axis 11 also becomes $\theta_i$. Height adjustment member 15 has, for example, a wedge shape. Height adjustment member 15 is an angle adjustment member that inclines length direction A of optical waveguide 3 at first predetermined angle $\theta_1$ with respect to optical axis 11 of light 6 in the predetermined plane.

With height adjustment member 15, first positioning guide 16 and second positioning guide 17 in FIG. 10 form a position adjustment member that moves waveguide structure 5 in a state where the angle between optical axis 11 of light 6 and length direction A of optical waveguide 3 in the predetermined plane is maintained at first predetermined angle $\theta_i$. The position adjustment member is a translation assisting member configured to move waveguide structure 5 in parallel. First positioning guide 16 is installed on an end surface of second mounting member 13 facing light source 2. Second positioning guide 17 is installed on an end surface of second mounting member 13 on a side opposite to light source 2. A surface of first positioning guide 16 in contact with second mounting member 13 is inclined at second predetermined angle $\theta_2$ with respect to vertical plane P perpendicular to length direction A of optical waveguide 3. Similarly, a surface of second positioning guide 17 in contact with second mounting member 13 is also inclined at second predetermined angle $\theta_2$ with respect to vertical plane P perpendicular to length direction A of optical waveguide 3.

When height adjustment member 15 is moved along disposition surface 14a of base 14 in a direction approaching light source 2 or in a direction separating from light source 2, waveguide structure 5 moves along first positioning guide 16 and second positioning guide 17 in the state where the angle between optical axis 11 of light 6 and length direction A of optical waveguide 3 in the predetermined plane is maintained at first predetermined angle $\theta_i$. As a result, incident end surface 7 of waveguide structure 5 can be moved in the state where the angle between optical axis 11 of light 6 and length direction A of optical waveguide 3 in the predetermined plane is maintained at first predetermined angle $\theta_1$ in the state of keeping the distance between emission surface 2b of light source 2 and incident end surface 7 of optical waveguide 3, that is, the state of keeping a size of region R on which light 6 is incident in waveguide structure 5. Therefore, it is easy to adjust a position where light 6 is efficiently incident on incident end surface 7.

First convex lens 9 and second convex lens 10 of converging optical system 20, and height adjustment member 15 are subjected to position adjustment such that the amount of light 6 converted to a predetermined wavelength by waveguide structure 5 is maximized, and then, are fixed to first mounting member 12 and base 14 by fixing units such as adhesives 18a, 18b, 18c. In FIG. 10, first convex lens 9 and second convex lens 10 are fixed to first mounting member 12 by adhesives 18a, 18b, and height adjustment member 15 is fixed to base 14 by adhesive 18c. Adhesives 18a, 18b, 18c are not immediately cured even after members to be attached are installed at an attachment position and applied, and the position adjustment can be performed. Adhesives 18a, 18b, 18c are, for example, ultraviolet curable resins.

Next, a method of mounting light source 2, converging optical system 20, and waveguide structure 5 on support 30B will be described. First, light source 2 and converging optical system 20 are mounted on first mounting member 12. Next, first mounting member 12 is installed and fixed onto disposition surface 14a of base 14. At this point in time, first convex lens 9 and second convex lens 10 of converging optical system 20 are not fixed. Next, waveguide structure 5 is mounted on second mounting member 13. Next, height adjustment member 15 is installed on disposition surface 14a of base 14. Second mounting member 13 is placed on height adjustment member 15. Second mounting member 13 and height adjustment member 15 are not fixed. Next, an ultraviolet curable resin is applied as adhesives 18a, 18b, 18c. First convex lens 9, second convex lens 10, and height adjustment member 15 are not fixed. Thereafter, first positioning guide 16 and second positioning guide 17 are installed and fixed onto disposition surface 14a of base 14. Thereafter, an electrical system is connected to light source 2 such that light 6 is emitted from light source 2. In this state, fine position adjustment of first convex lens 9 and second convex lens 10 is performed such that light 6 converges the most in a plane including incident end surface 7. Thereafter, height adjustment member 15 is moved in the direction approaching light source 2 or the direction (length direction A of optical waveguide 3) separating from light source 2 to perform the fine position adjustment such that the amount of light 6 emitted from emission end surface 8 of optical waveguide 3 is maximized. That is, converging optical system 20 is adjusted such that region R on which light 6 is incident falls within incident end surface 7. After the position adjustment, ultraviolet rays are emitted to cure adhesives 18a, 18b, 18c, thereby fixing first convex lens 9, second convex lens 10, second mounting member 13, and height adjustment member 15. As a result, light emitting device 1B illustrated in FIG. 10 is obtained.

In this manner, in a structure in which not light source 2 but waveguide structure 5 is installed to be inclined with respect to disposition surface 14a of base 14 to perform the position adjustment, a cross section of light 6 on incident end surface 7 is included in incident end surface 7, and optical axis 11 of light 6 is inclined with respect to length direction A of optical waveguide 3. Thus, beams 61 of light 6 enter optical waveguide 3 from incident end surface 7 without leakage, and a length of an optical path propagating in optical waveguide 3 with total internal reflection at boundary surface B between optical waveguide 3 and exterior part 4 is longer than a length of optical waveguide 3, so that the wavelength conversion efficiency is increased.

As described above, light emitting device 1B further includes base 14 having disposition surface 14a on which light source 2 and waveguide structure 5 are disposed. Length direction A of optical waveguide 3 of waveguide structure 5 is inclined with respect to a creepage direction of disposition surface 14a of base 14 in the predetermined plane. According to this configuration, the positional relationship between light source 2 and waveguide structure 5 can be easily set.

[2.3 Other Modifications]

In one modification, light source 2 is not limited to a semiconductor laser, and may be another light source. In addition, an electromagnetic wave source that emits an electromagnetic wave having directionality may be used instead of light source 2.

In one modification, a shape of optical waveguide 3 is not limited to a hexahedral shape, and may be a cylindrical shape or another polyhedral shape. Cross-sectional shapes of incident end surface 7 and emission end surface 8 are not limited to a rectangle, and may be a circle, an ellipse, or another polygon.

In one modification, a shape of exterior part 4 is not limited to the hexahedral shape, and may be a cylindrical shape or another polyhedral shape.

In one modification, waveguide structure 5 is not limited to the optical waveguide SHG element, and may be another waveguide structure.

In one modification, converging optical system 20 is not limited to the configuration including first convex lens 9 and second convex lens 10, and may be another converging optical system. As for a lens shape, not only a convex lens but also a spherical lens may be used. First convex lens 9 and second convex lens 10 are not limited to a perfect circular shape when viewed from a direction of optical axis 11, and may have a polygonal shape such as an elliptical shape or a regular polygonal shape.

In one modification, a cross-sectional shape of optical waveguide 3 on emission end surface 8 is not limited to a rectangle, and may be a circle, an ellipse, or another polygon.

In one modification, a cross-sectional shape of light 6 on emission end surface 8 is not limited to an elliptical shape, and may be a circle or another polygon.

In one modification, adhesives 18a to 18e are not limited to the ultraviolet curable resin, and may be a thermosetting resin, a room temperature-curable resin, or another adhesive. Adhesives 18a to 18e are not limited to being applied after members to be attached are installed at attachment positions, and may be applied in advance to the attachment positions or may be applied after the fine position adjustment is performed.

In one modification, antireflection film 40 is not limited to the film made of the material having the lower refractive index than optical waveguide 3, and may be another film. The configuration of the film is not limited to the single-layer film, and may be a multilayer film in which a material having a low refractive index and a material having a high refractive index are combined. Antireflection film 40 is not limited to being formed on incident end surface 7 of waveguide structure 5, and may be formed on emission surface 2b of light source 2. In this case, when the positions of light source 2 and waveguide structure 5 are adjusted, the movement of height adjustment member 35 in length direction A of optical waveguide 3 with respect to waveguide structure 5 causes antireflection film 40 formed on light source 2 to move along incident end surface 7 of waveguide structure 5 instead of causing light source 2 to move along antireflection film 40.

In the first exemplary embodiment, optical axis 11 of light 6 of light source 2 is inclined with respect to the creepage direction of disposition surface 14a of base 14 in the predetermined plane. In Modification 2, length direction A of optical waveguide 3 of waveguide structure 5 is inclined with respect to the creepage direction of disposition surface 14a of base 14 in the predetermined plane. In one modification, at least one of optical axis 11 of light 6 of light source 2 and length direction A of optical waveguide 3 of waveguide structure 5 may be inclined with respect to a creepage direction of disposition surface 14a, 34a of base 14, 34 in a predetermined plane. According to this configuration, the positional relationship between light source 2 and waveguide structure 5 can be easily set.

[3. Aspects]

As is apparent from the above exemplary embodiments and modifications, the present disclosure includes the following aspects. In the following, reference symbols are given in parentheses only to clarify the correspondence with the exemplary embodiments.

A first aspect is light emitting device (1; 1A) including light source (2) configured to emit light (6) having a directionality; and waveguide structure (5) including optical waveguide (3) that has incident end surface (7) and emission end surface (8) and exterior part (4) that is optically transparent and covers optical waveguide (3) with incident end surface (7) and emission end surface (8) being exposed from exterior part (4). Optical waveguide (3) is configured to convert a wavelength of light (6) incident from incident end surface (7) and emit light (6) from emission end surface (8). Optical waveguide (3) is elongated in length direction (A). Length direction (A) of optical waveguide (3) is inclined at a predetermined angle with respect to optical axis (11) of light (6) in a predetermined plane including length direction (A) of optical waveguide (3) and optical axis (11) of light (6). The predetermined angle is set to allow light (6) to propagate in optical waveguide (3) with total internal reflection at boundary surface (B) between optical waveguide (3) and exterior part (4). According to this aspect, damage to light source (2) can be reduced, and the utilization efficiency and the wavelength conversion efficiency of light (6) can be further improved.

A second aspect is light emitting device (1) based on the first aspect. In the second aspect, light (6) has an intensity distribution in a radial direction orthogonal to optical axis (11). The intensity distribution including a peak intensity and an intensity of $1/e^2$ of the peak intensity. Light 6 has beams (61) defined in a range from the peak intensity to the intensity of $1/e^2$ of the peak intensity, inclusive. Beams (61) converge within incident end surface (7). In other words, region (R) corresponding to a cross-section of the beams defined by $1/e^2$ of the peak intensity of light (6) incident on end surface (5a) of waveguide structure (5) falls within incident end surface (7). According to this aspect, the utilization efficiency of light (6) can be improved.

A third aspect is light emitting device (1) based on the second aspect. In the third aspect, light emitting device (1) further includes converging optical system (20) that is disposed on optical axis (11) of light (6) and converges light (6) on incident end surface (7). According to this aspect, damage to light source (2) can be reduced, and the utilization efficiency and the wavelength conversion efficiency of light (6) can be further improved.

A fourth aspect is light emitting device (1) based on the third aspect. In the fourth aspect, the predetermined angle satisfies the following formula.

$$\theta_1 \leq \arcsin\left[n_2 \cdot \sin\left\{90° - \theta_2 - \arcsin\left(\frac{n_1}{n_2}\right)\right\}\right] - \frac{\varphi_1}{2} + \theta_2$$

$n_1$ denotes a refractive index of exterior part (4).
$n_2$ denotes a refractive index of optical waveguide (3).
$\theta_1$ denotes the predetermined angle.
$\theta_2$ denotes an angle between incident end surface (7) and vertical plane (P) perpendicular to length direction (A) of optical waveguide (3) in the predetermined plane.
$\varphi_1$ denotes an apex angle of a light flux of light (6) converged on incident end surface (7) by converging optical system (20) in the predetermined plane.

According to this aspect, the wavelength conversion efficiency of light (6) can be improved.

A fifth aspect is light emitting device (1) based on the third or fourth aspect. In the fifth aspect, incident end surface (7) partially reflects beams (61) to generate reflected beams. The predetermined angle is set to prevent the reflected beams from being incident on light source (2). According to this aspect, the damage to light source (2) can be prevented.

A sixth aspect is light emitting device (1) based on the fifth aspect. In the sixth aspect, the predetermined angle satisfies the following formula.

$$\theta_1 > \frac{2\theta_2 + \frac{\varphi_1}{2} + \arctan\left(\frac{r}{x}\right)}{2}$$

r denotes an effective radius of converging optical system (20).
x denotes a distance from incident end surface (7) to converging optical system (20).
$\theta_1$ denotes the predetermined angle.
$\theta_2$ denotes an angle between incident end surface (7) and vertical plane (P) perpendicular to length direction (A) of optical waveguide (3) in the predetermined plane.
$\varphi_1$ denotes an apex angle of a light flux of light (6) converged on incident end surface (7) by converging optical system (20) in the predetermined plane.

According to this aspect, the damage to light source (2) can be reduced.

A seventh aspect is light emitting device (1) based on the sixth aspect. In the seventh aspect, converging optical system (20) has a converging lens (second convex lens 10) as a component located closest to incident end surface (7). The effective radius is the radius of the converging lens. The distance from incident end surface (7) to converging optical system (20) is a distance from incident end surface (7) to the converging lens. According to this aspect, the damage to light source (2) can be reduced.

An eighth aspect is light emitting device (1) based on the sixth aspect. In the eighth aspect, converging optical system (20) has aperture (50) as a component located closest to incident end surface (7). The effective radius is a radius of opening (50a) of aperture (50). The distance from incident end surface (7) to converging optical system (20) is a distance from incident end surface (7) to aperture (50). According to this aspect, the damage to light source (2) can be reduced.

A ninth aspect is light emitting device (1) based on any one of the third to eighth aspects. In the ninth aspect, emission end surface (8) is inclined with respect to vertical plane (P) perpendicular to length direction (A) of optical waveguide (3) in the predetermined plane. According to this aspect, the utilization efficiency of light (6) can be improved.

A tenth aspect is light emitting device (1) based on the ninth aspect. In the tenth aspect, an angle of emission end surface (8) inclined with respect to vertical plane (P) in the predetermined plane satisfies the following formula.

$$\theta_3 < \arcsin\left(\frac{1}{n_2}\right) - \arcsin\left\{\frac{\sin\left(\theta_1 + \frac{\varphi_1}{2} - \theta_2\right)}{n_2}\right\} - \theta_2$$

$n_2$ denotes a refractive index of optical waveguide (3).
$\theta_1$ denotes the predetermined angle.
$\theta_2$ denotes an angle between incident end surface (7) and vertical plane (P) perpendicular to length direction (A) of optical waveguide (3) in the predetermined plane.
$\theta_3$ denotes the angle of emission end surface (8) inclined with respect to vertical plane (P) in the predetermined plane.
$\varphi_1$ denotes an apex angle of a light flux of light (6) converged on incident end surface (7) by converging optical system (20) in the predetermined plane.

According to this aspect, the utilization efficiency of light (6) can be improved.

An eleventh aspect is light emitting device (1) based on any one of the first to tenth aspects. In the eleventh aspect, light emitting device (1) further includes: an angle adjustment member (height adjustment member 15) configured to incline optical axis (11) of light (6) at the predetermined angle with respect to length direction (A) of optical waveguide (3) in the predetermined plane; and a position adjustment member (height adjustment member 15, first and second positioning guides 16, 17) configured to move at least one of light source (2) and waveguide structure (5) in a state where an angle between optical axis (11) of light (6) and length direction (A) of optical waveguide (3) in the predetermined plane is maintained at the predetermined angle and a distance between emission surface (2b) of light source (2) and incident end surface (7) is kept constant. According to this aspect, the positional relationship between light source (2) and waveguide structure (5) can be easily set.

A twelfth aspect is light emitting device (1A) based on the first or second aspect. In the twelfth aspect, light emitting device (1A) further includes antireflection film (40) disposed between light source (2) and optical waveguide (3). Light source (2) has emission surface (2b) that allows emission of light (6). First surface (40a) of antireflection film (40) in a thickness direction is in contact with emission surface (2b) of light source (2). Second surface (40b) antireflection film (40) in the thickness direction of is in contact with incident end surface (7) of optical waveguide (3). An angle between incident end surface (7) and vertical plane (P) perpendicular to length direction (A) of optical waveguide (3) in the predetermined plane is equal to the predetermined angle. According to this aspect, damage to light source (2) can be reduced, and the utilization efficiency and the wavelength conversion efficiency of light (6) can be further improved.

A thirteenth aspect is light emitting device (1A) based on the twelfth aspect. In the thirteenth aspect, the predetermined angle satisfies the following formula.

$$\theta_1 \leq 90° - \arcsin\left\{\frac{\sin\left(\frac{\varphi_2}{2}\right) \cdot n_3}{n_2}\right\} - \arcsin\left(\frac{n_1}{n_2}\right)$$

$n_1$ denotes a refractive index of exterior part (4).
$n_2$ denotes a refractive index of optical waveguide (3).
$n_3$ denotes a refractive index of antireflection film (40).
$\theta_1$ denotes the predetermined angle.
$\varphi_2$ denotes a divergence angle of a light flux of light (6) in antireflection film (40) in the predetermined plane.

According to this aspect, the wavelength conversion efficiency of light (6) can be improved.

A fourteenth aspect is light emitting device (1A) based on the twelfth or thirteenth aspect. In the fourteenth aspect, emission end surface (8) is inclined with respect to vertical plane (P) in the predetermined plane. According to this aspect, the utilization efficiency of light (6) can be improved.

A fifteenth aspect is light emitting device (1A) based on the fourteenth aspect. In the fifteenth aspect, an angle of emission end surface (8) inclined with respect to vertical plane (P) in the predetermined plane satisfies the following formula.

$$\theta_3 \leq \arcsin\left(\frac{1}{n_2}\right) - \arcsin\left\{\frac{\sin\left(\frac{\varphi_2}{2}\right) \cdot n_3}{n_2}\right\} - \theta_1$$

$n_2$ denotes a refractive index of optical waveguide (3).
$n_3$ denotes a refractive index of antireflection film (40).
$\theta_1$ denotes the predetermined angle.
$\theta_3$ denotes the angle of emission end surface (8) inclined with respect to vertical plane (P) in the predetermined plane.

$\varphi_2$ denotes a divergence angle of a light flux of light (6) in antireflection film (40) in the predetermined plane.

According to this aspect, the utilization efficiency of light (6) can be improved.

A sixteenth aspect is light emitting device (1A) based on any one of the twelfth to fifteenth aspects. In the sixteenth aspect, light 6 has an intensity distribution in a radial direction orthogonal to optical axis 11. The intensity distribution includes a peak intensity and an intensity of $1/e^2$ of the peak intensity. Light 6 has beams (61) defined in a range from the peak intensity to the intensity of $1/e^2$ of the peak intensity, inclusive. Antireflection film (40) has a thickness set to allow beams (61) to be incident on incident end surface (7). According to this aspect, the utilization efficiency of light (6) can be improved.

A seventeenth aspect is light emitting device (1A) based on the sixteenth aspect. In the seventeenth aspect, the thickness of antireflection film (40) satisfies the following formula.

$$D_C \leq \frac{\left\{\frac{D_w}{2\sin(90° - \theta_1)} - \frac{D_a}{2}\right\}}{\tan\left(\frac{\varphi_2}{2}\right)}$$

$D_w$ denotes a dimension of optical waveguide (3) in a direction orthogonal to length direction (A) of optical waveguide (3) in the predetermined plane.
$D_a$ denotes a dimension of emission surface (2b) of light source (2) in a direction orthogonal to optical axis (11) of light (6) in the predetermined plane.
$D_c$ denotes the thickness of antireflection film (40).
$\theta_1$ denotes the predetermined angle.
$\varphi_2$ denotes a divergence angle of a light flux of light (6) in the antireflection film (40).

According to this aspect, the utilization efficiency of light (6) can be improved.

An eighteenth aspect is light emitting device (1A) based on the sixteenth or seventeenth aspect. In the eighteenth aspect, the thickness of antireflection film (40) is larger than 50 nm and smaller than 2500 nm. According to this aspect, the utilization efficiency of light (6) can be improved.

A nineteenth aspect is light emitting device (1A) based on any one of the twelfth to eighteenth aspects. In the nineteenth aspect, light emitting device (1A) further includes an adjustment member (35) configured to incline optical axis (11) of light (6) at the predetermined angle with respect to length direction (A) of optical waveguide (3) in the predetermined plane. Antireflection film (40) is a part of a position adjustment member configured to move at least one of light source (2) and waveguide structure (5) in a state where the angle between optical axis (11) of light (6) and length direction (A) of optical waveguide (3) in the predetermined plane is maintained at the predetermined angle and the distance between emission surface (2b) of light source (2) and incident end surface (7) is kept constant. According to this aspect, the positional relationship between light source (2) and waveguide structure (5) can be easily set. In particular, light emitting device (1A) further includes height adjustment member (35) configured to adjust a height of light source 2 from waveguide structure 5, and height adjustment member (35) forms a position adjustment member together with antireflection film (40).

A twentieth aspect is light emitting device (1; 1A) based on any one of the first to nineteenth aspects. In the twentieth aspect, light emitting device (1; 1A) further includes base (14; 34) having disposition surface (14a; 34a) on which light source (2) and waveguide structure (5) are disposed. At least one of optical axis (11) of light (6) of light source (2) and length direction (A) of optical waveguide (3) of waveguide structure (5) is inclined with respect to a creepage direction of disposition surface (14a; 34a) of base (14; 34) in the predetermined plane. According to this aspect, the positional relationship between light source (2) and waveguide structure (5) can be easily set.

A twenty-first aspect is light emitting device (1; 1A) based on any one of the first to twentieth aspects. In the twenty-first aspect, waveguide structure (5) is an optical waveguide SHG element. According to this aspect, the wavelength conversion efficiency of light (6) can be improved.

A twenty-second aspect is a manufacturing method for light emitting device (1; 1A). Light emitting device (1) includes: light source (2) configured to emit light (6) having a directionality; and waveguide structure (5) including optical waveguide (3) that has incident end surface (7) and emission end surface (8) and exterior part (4) that is optically transparent and covers optical waveguide (3) with incident end surface (7) and emission end surface (8) being exposed from exterior part (4). Optical waveguide (3) is configured to convert a wavelength of light (6) incident from incident end surface (7) and emit light (6) from emission end surface (8). The manufacturing method includes setting a predetermined angle to allow light (6) to propagate in optical waveguide (3) with total internal reflection at boundary surface (B) between optical waveguide (3) and an exterior part (4). Optical waveguide (3) is elongated in length direction (A). The predetermined angle is an angle between length direction (A) of optical waveguide (3) and optical axis (11) of light (6) in a predetermined plane including length direction (A) of optical waveguide (3) and optical axis (11) of light (6). According to this aspect, the damage to light source (2) can be prevented, and the utilization efficiency and the wavelength conversion efficiency of light (6) can be improved.

A twenty-third aspect is the manufacturing method based on the twenty-second aspect. In the twenty-third aspect, light emitting device (1; 1A) further includes: an angle adjustment member (height adjustment member 15; 35) configured to incline optical axis (11) of light (6) at the predetermined angle with respect to length direction (A) of optical waveguide (3) in the predetermined plane; and a position adjustment member (height adjustment member 15, first and second positioning guides 16, 17; height adjustment member 35 and antireflection film 40) configured to move at least one of light source (2) and waveguide structure (5) in a state where an angle between optical axis (11) of light (6) and length direction (A) of optical waveguide (3) in the predetermined plane is maintained at the predetermined angle and a distance between emission surface (2b) of light source (2) and incident end surface (7) is kept constant. The manufacturing method further includes determining positions of light source (2) and waveguide structure (5) to obtain a maximum amount of light (6) emitted from emission end surface (8) of waveguide structure (5) by moving at least one of light source (2) and waveguide structure (5) using the angle adjustment member and the position adjustment member. According to this aspect, the positional relationship between light source (2) and waveguide structure (5) can be easily set.

A twenty-fourth aspect is waveguide structure (5) including: optical waveguide (3) that has incident end surface (7) and emission end surface (8), and is configured to convert a wavelength of light (6) and emit light (6) from emission end surface (8), light (6) having a directionality and being incident from incident end surface (7); and exterior part (4) that is optically transparent and covers optical waveguide (3) with incident end surface (7) and emission end surface (8) being exposed from exterior part (4). Optical waveguide (3) is elongated in length direction (A). Length direction (A) of optical waveguide (3) is inclined at a predetermined angle with respect to optical axis (11) of light (6) in a predetermined plane including length direction (A) of optical waveguide (3) and optical axis (11) of light (6). The predetermined angle is set to allow light (6) to propagate in optical waveguide (3) with total internal reflection at boundary surface (B) between optical waveguide (3) and exterior part (4). According to this aspect, the damage to light source (2) can be prevented, and the utilization efficiency and the wavelength conversion efficiency of light (6) can be improved.

Note that the second to twenty-first aspects can also be appropriately modified and applied to the twenty-second aspect or the twenty-fourth aspect.

According to the aspects of the present disclosure, the damage to the light source can be reduced, and further, the utilization efficiency and the wavelength conversion efficiency of light can be improved.

The present disclosure is applicable to light emitting devices. Specifically, the present disclosure is applicable to a light emitting device including a light source that emits light having directionality. In addition, the present disclosure is also applicable to an irradiation device that emits an electromagnetic wave having directionality.

What is claimed is:
1. A light emitting device comprising:
a light source configured to emit light having a directionality; and
a waveguide structure including:
an optical waveguide that has an incident end surface and an emission end surface, the waveguide being configured to convert a wavelength of the light incident from the incident end surface and emit the light from the emission end surface, and
an exterior part that is optically transparent and covers the entire circumference of the optical waveguide in a length direction, the incident end surface and the emission end surface being exposed from the exterior part,
a converging optical system that is disposed on the optical axis of the light and configured to converge the light on the incident end surface, and
a base having a flat disposition surface on which the light source, the converging optical system, and the waveguide structure are disposed,
wherein
the optical waveguide is elongated in the length direction,
the exterior part is made of a material having a smaller refractive index than the optical waveguide,
the length direction of the optical waveguide is inclined at a predetermined angle with respect to an optical axis of the light in a predetermined plane including the length direction of the optical waveguide and the optical axis of the light,
the predetermined angle is set to allow the light to propagate in the optical waveguide with total internal reflection at a boundary surface between the optical waveguide and the exterior part,
a flat mounting member made of a material having high thermal conductivity is disposed on the flat disposition surface of the base, the waveguide structure having a flat bottom surface is disposed on the flat mounting member, the flat disposition surface of the base and the flat bottom surface of the waveguide structure face each other via the flat mounting member, and heat of the waveguide structure is transmitted to the base via the flat mounting member and dissipated.

2. The light emitting device according to claim 1, wherein the light has an intensity distribution in a radial direction orthogonal to the optical axis, the intensity distribution including a peak intensity and an intensity of $1/e^2$ of the peak intensity, the light has beams defined in a range from the peak intensity to the intensity of $1/e^2$ of the peak intensity, inclusive, and the beams converge within the incident end surface.

3. The light emitting device according to claim 1, wherein the predetermined angle satisfies a following formula:

$$\theta_1 \leq \arcsin\left[n_2 \cdot \sin\left\{90° - \theta_2 - \arcsin\left(\frac{n_1}{n_2}\right)\right\}\right] - \frac{\varphi_1}{2} + \theta_2$$

wherein $n_1$ denotes a refractive index of the exterior part, $n_2$ denotes a refractive index of the optical waveguide, $\theta_1$ denotes the predetermined angle, $\theta_2$ denotes an angle between the incident end surface and a vertical plane perpendicular to the length direction of the optical waveguide in the predetermined plane, and $\varphi_1$ denotes an apex angle of a light flux of the light converged on the incident end surface by the converging optical system in the predetermined plane.

4. The light emitting device according to claim 1, wherein the incident end surface is configured to partially reflect the beams to generate reflected beams, and the predetermined angle is set to prevent the reflected beams from being incident on the light source.

5. The light emitting device according to claim 4, wherein the predetermined angle satisfies a following formula:

$$\theta_1 > \frac{2\theta_2 + \frac{\varphi_1}{2} + \arctan\left(\frac{r}{x}\right)}{2}$$

wherein r denotes an effective radius of the converging optical system, x denotes a distance from the incident end surface to the converging optical system, $\theta_1$ denotes the predetermined angle, $\theta_2$ denotes an angle between the incident end surface and a vertical plane perpendicular to the length direction of the optical waveguide in the predetermined plane, and $\varphi_1$ denotes an apex angle of a light flux of the light converged on the incident end surface by the converging optical system in the predetermined plane.

6. The light emitting device according to claim 5, wherein the converging optical system has a converging lens as a component located closest to the incident end surface, the effective radius is a radius of the converging lens, and the distance from the incident end surface to the converging optical system is a distance from the incident end surface to the converging lens.

7. The light emitting device according to claim 5, wherein the converging optical system has an aperture as a component located closest to the incident end surface, the effective radius is a radius of an opening of the aperture, and the distance from the incident end surface to the converging optical system is a distance from the incident end surface to the aperture.

8. The light emitting device according to claim 1, wherein the emission end surface is inclined with respect to a vertical plane perpendicular to the length direction of the optical waveguide in the predetermined plane.

9. The light emitting device according to claim 8, wherein an angle of the emission end surface inclined with respect to the vertical plane in the predetermined plane satisfies a following formula:

$$\theta_3 < \arcsin\left(\frac{1}{n_2}\right) - \arcsin\left\{\frac{\sin\left(\theta_1 + \frac{\varphi_1}{2} - \theta_2\right)}{n_2}\right\} - \theta_2$$

wherein $n_2$ denotes a refractive index of the optical waveguide, $\theta_1$ denotes the predetermined angle, $\theta_2$ denotes an angle between the incident end surface and a vertical plane perpendicular to the length direction of the optical waveguide in the predetermined plane, $\theta_3$ denotes the angle of the emission end surface inclined with respect to the vertical plane in the predetermined plane, and $\varphi_1$ denotes an apex angle of a light flux of the light converged on the incident end surface by the converging optical system in the predetermined plane.

10. The light emitting device according to claim 1, further comprising:

an angle adjustment member configured to incline the optical axis of the light at the predetermined angle with respect to the length direction of the optical waveguide in the predetermined plane; and a position adjustment member configured to move at least one of the light source and the waveguide structure in a state where an angle between the optical axis of the light and the length direction of the optical waveguide in the predetermined plane is maintained at the predetermined angle and a distance between an emission surface of the light source and the incident end surface of the optical waveguide is kept constant, the emission surface allowing emission of the light.

11. The light emitting device according to claim 1, further comprising an antireflection film disposed between the light source and the optical waveguide, wherein the light source has an emission surface that allows emission of the light, a first surface of the antireflection film in a thickness direction is in contact with the emission surface of the light source, a second surface of the antireflection film in the thickness direction is in contact with the incident end surface of the optical waveguide, and an angle between the incident end surface and a vertical plane perpendicular to the length direction of the optical waveguide in the predetermined plane is equal to the predetermined angle.

12. The light emitting device according to claim 11, wherein the predetermined angle satisfies a following formula:

$$\theta_1 \le 90° - \arcsin\left\{\frac{\sin\left(\frac{\varphi_2}{2}\right) \cdot n_3}{n_2}\right\} - \arcsin\left(\frac{n_1}{n_2}\right)$$

wherein $n_1$ denotes a refractive index of the exterior part,
$n_2$ denotes a refractive index of the optical waveguide,
$n_3$ denotes a refractive index of the antireflection film,
$\theta_1$ denotes the predetermined angle, and
$\varphi_2$ denotes a divergence angle of a light flux of the light in the antireflection film in the predetermined plane.

13. The light emitting device according to claim 11, wherein the emission end surface is inclined with respect to the vertical plane in the predetermined plane.

14. The light emitting device according to claim 13, wherein an angle of the emission end surface inclined with respect to the vertical plane in the predetermined plane satisfies a following:

$$\theta_3 \le \arcsin\left(\frac{1}{n_2}\right) - \arcsin\left\{\frac{\sin\left(\frac{\varphi_2}{2}\right) \cdot n_3}{n_2}\right\} - \theta_1$$

wherein $n_2$ denotes a refractive index of the optical waveguide,
$n_3$ denotes a refractive index of the antireflection film,
$\theta_1$ denotes the predetermined angle,
$\theta_3$ denotes the angle of the emission end surface inclined with respect to the vertical plane in the predetermined plane, and
$\varphi_2$ denotes a divergence angle of a light flux of the light in the antireflection film in the predetermined plane.

15. The light emitting device according to claim 11, wherein
the light has an intensity distribution in a radial direction orthogonal to the optical axis, the intensity distribution including a peak intensity and an intensity of $1/e^2$ of the peak intensity,
the light has beams defined in a range from the peak intensity of the light to the intensity of $1/e^2$ of the peak intensity of the light, inclusive, and
the antireflection film has a thickness set to allow the beams to be incident on the incident end surface.

16. The light emitting device according to claim 15, wherein the thickness of the antireflection film satisfies a following formula:

$$D_C \le \frac{\left\{\frac{D_w}{2\sin(90° - \theta_1)} - \frac{D_a}{2}\right\}}{\tan\left(\frac{\varphi_2}{2}\right)}$$

wherein $D_w$ denotes a dimension of the optical waveguide in a direction orthogonal to the length direction of the optical waveguide in the predetermined plane,
$D_a$ denotes a dimension of the emission surface of the light source in a direction orthogonal to the optical axis of the light in the predetermined plane,
$D_c$ denotes the thickness of the antireflection film,
$\theta_1$ denotes the predetermined angle, and
$\varphi_2$ denotes a divergence angle of a light flux of the light in the antireflection film.

17. The light emitting device according to claim 15, wherein the antireflection film has a thickness larger than 50 nm and smaller than 2500 nm.

18. The light emitting device according to claim 11, further comprising an adjustment member configured to incline the optical axis of the light at the predetermined angle with respect to the length direction of the optical waveguide in the predetermined plane, wherein
the antireflection film is a part of a position adjustment member configured to move at least one of the light source and the waveguide structure in a state where an angle between the optical axis of the light and the length direction of the optical waveguide in the predetermined plane is maintained at the predetermined angle and a distance between an emission surface of the light source and the incident end surface of the optical waveguide is kept constant.

19. The light emitting device according to claim 1, further comprising a base having a disposition surface on which the light source and the waveguide structure are disposed, wherein
at least one of the optical axis of the light of the light source and the length direction of the optical waveguide of the waveguide structure is inclined with respect to the disposition surface of the base in the predetermined plane.

20. The light emitting device according to claim 1, wherein the waveguide structure is an optical waveguide second-harmonic generation element.

21. A light emitting device comprising:
a light source configured to emit light having a directionality;
a waveguide structure which includes:
an optical waveguide that has an incident end surface and an emission end surface, the waveguide being configured to convert a wavelength of the light incident from the incident end surface and emit the light from the emission end surface, and
an exterior part that is optically transparent and covers the entire circumference of the optical waveguide in a length direction, the incident end surface and emission end surface being exposed from the exterior part,
a converging optical system that is disposed on the optical axis of the light and configured to converge the light on the incident end surface;
a base having a disposition surface on which the light source, the converging optical system, and the waveguide structure are disposed;
a mounting member disposed on the disposition surface the base;
an adjustment member that is disposed between the disposition surface and the mounting member and adjusts height and inclination angle of the mounting member relative to the disposition surface; and
an adhesive that join the adjustment member to the base; wherein
the optical waveguide is elongated in the length direction,
the exterior part is made of a material having a smaller reflective index than the optical waveguide,
the length direction of the optical waveguide is inclined at a predetermined angle with respect to an optical axis of the light in a predetermined plane including the length direction of the optical waveguide and the optical axis of the light, and
the predetermined angle is set to allow the light to propagate in the optical waveguide with total internal reflection at a boundary surface between the optical waveguide and the exterior part.

22. The light emitting device according to claim 21, wherein the adhesive is an ultraviolet curable resin.

* * * * *